(12) United States Patent
Penner et al.

(10) Patent No.: US 12,458,365 B2
(45) Date of Patent: Nov. 4, 2025

(54) SURGICAL GUIDE WITH CUTTING DEPTH INFORMATION

(71) Applicant: WRIGHT MEDICAL TECHNOLOGY, INC., Memphis, TN (US)

(72) Inventors: Murray John Penner, Vancouver (CA); Julia C. Alspaugh, Memphis, TN (US); Jesse G. Moore, Germantown, TN (US)

(73) Assignee: WRIGHT MEDICAL TECHNOLOGY, INC., Memphis, TN (US)

( * ) Notice: Subject to any disclaimer, the term of this patent is extended or adjusted under 35 U.S.C. 154(b) by 179 days.

(21) Appl. No.: 18/249,616

(22) PCT Filed: Jan. 12, 2022

(86) PCT No.: PCT/US2022/070144
§ 371 (c)(1),
(2) Date: Apr. 19, 2023

(87) PCT Pub. No.: WO2022/170291
PCT Pub. Date: Aug. 11, 2022

(65) Prior Publication Data
US 2023/0389937 A1  Dec. 7, 2023

Related U.S. Application Data

(60) Provisional application No. 63/146,020, filed on Feb. 5, 2021.

(51) Int. Cl.
A61B 17/15 (2006.01)
A61B 17/16 (2006.01)

(52) U.S. Cl.
CPC .......... *A61B 17/15* (2013.01); *A61B 17/1604* (2013.01); *A61B 17/1682* (2013.01)

(58) Field of Classification Search
CPC ... A61B 17/1682; A61B 17/15–17/158; A61B 17/1775
See application file for complete search history.

(56) References Cited

U.S. PATENT DOCUMENTS 3,839,742 A   10/1974  Link
3,872,519 A   3/1975   Giannestras et al.
(Continued)

FOREIGN PATENT DOCUMENTS

CA    2836651      3/2016
CN    101790353   7/2010
(Continued)

OTHER PUBLICATIONS

Extended European Search Report issued in connection with European Patent Application No. 22750604.5, Sep. 19, 2024, 9 pages.
(Continued)

*Primary Examiner* — Zade Coley
(74) *Attorney, Agent, or Firm* — DUANE MORRIS LLP

(57) ABSTRACT

A guide for use in cutting a bone is disclosed. The guide includes a bone contacting surface contoured to conformably mate with a first bone surface when placed against the first bone surface, and a guide surface that is spaced apart from the bone contacting surface. At least one prescribed patient-specific depth of cut information is provided on the guide surface that corresponds to the desired depth of cut being made using the guide.

30 Claims, 21 Drawing Sheets

(56) References Cited

U.S. PATENT DOCUMENTS

| | | | |
|---|---|---|---|
| 3,886,599 A | 6/1975 | Schlein |
| 3,889,300 A | 6/1975 | Smith |
| 3,896,502 A | 7/1975 | Lennox |
| 3,896,503 A | 7/1975 | Freeman et al. |
| 3,975,778 A | 8/1976 | Newton, III |
| 3,987,500 A | 10/1976 | Schlein |
| 4,021,864 A | 5/1977 | Waugh |
| 4,069,518 A | 1/1978 | Groth, Jr. et al. |
| 4,156,944 A | 6/1979 | Schreiber et al. |
| 4,166,292 A | 9/1979 | Bokros |
| 4,204,284 A | 5/1980 | Koeneman |
| 4,232,404 A | 11/1980 | Samuelson et al. |
| 4,309,778 A | 1/1982 | Buechel et al. |
| 4,470,158 A | 9/1984 | Pappas et al. |
| 4,755,185 A | 7/1988 | Tarr |
| 4,968,316 A | 11/1990 | Hergenroeder |
| 5,041,139 A | 8/1991 | Brånemark |
| 5,312,412 A | 5/1994 | Whipple |
| 5,326,365 A | 7/1994 | Alvine |
| 5,354,300 A | 10/1994 | Goble et al. |
| 5,395,188 A | 3/1995 | Bailey et al. |
| 5,423,825 A | 6/1995 | Levine |
| 5,476,466 A | 12/1995 | Barrette et al. |
| 5,601,563 A | 2/1997 | Burke et al. |
| 5,628,749 A | 5/1997 | Vendrely et al. |
| 5,634,927 A | 6/1997 | Houston et al. |
| 5,667,511 A | 9/1997 | Vendrely et al. |
| 5,674,223 A | 10/1997 | Cipolletti et al. |
| 5,735,904 A | 4/1998 | Pappas |
| 5,766,259 A | 6/1998 | Sammarco |
| 5,768,134 A | 6/1998 | Swaelens et al. |
| 5,776,200 A | 7/1998 | Johnson et al. |
| 5,817,097 A | 10/1998 | Howard et al. |
| 5,824,106 A | 10/1998 | Fournal |
| 5,879,389 A | 3/1999 | Koshino |
| 5,885,299 A | 3/1999 | Winslow et al. |
| 5,888,203 A | 3/1999 | Goldberg |
| 5,897,559 A | 4/1999 | Masini |
| 5,935,132 A | 8/1999 | Bettuchi et al. |
| 6,002,859 A | 12/1999 | DiGioia, III et al. |
| 6,033,405 A | 3/2000 | Winslow et al. |
| 6,053,922 A | 4/2000 | Krause et al. |
| 6,102,952 A | 8/2000 | Koshino |
| 6,183,519 B1 | 2/2001 | Bonnin et al. |
| 6,245,109 B1 | 6/2001 | Mendes et al. |
| 6,342,056 B1 | 1/2002 | Mac-Thiong et al. |
| 6,344,043 B1 | 2/2002 | Pappas |
| 6,409,767 B1 | 6/2002 | Pericéet al. |
| 6,436,146 B1 | 8/2002 | Hassler et al. |
| 6,478,800 B1 | 11/2002 | Fraser et al. |
| 6,520,964 B2 | 2/2003 | Tallarida et al. |
| 6,530,930 B1 | 3/2003 | Marino et al. |
| 6,554,838 B2 * | 4/2003 | McGovern ......... A61B 17/1764 606/87 |
| 6,602,259 B1 | 8/2003 | Masini |
| 6,610,067 B2 | 8/2003 | Tallarida et al. |
| 6,610,095 B1 | 8/2003 | Pope et al. |
| 6,620,168 B1 | 9/2003 | Lombardo et al. |
| 6,645,215 B1 | 11/2003 | McGovern et al. |
| 6,663,669 B1 | 12/2003 | Reiley |
| 6,673,116 B2 | 1/2004 | Reiley |
| 6,679,917 B2 | 1/2004 | Ek |
| 6,719,799 B1 | 4/2004 | Kropf |
| 6,824,567 B2 | 11/2004 | Tornier et al. |
| 6,852,130 B2 | 2/2005 | Keller et al. |
| 6,860,902 B2 | 3/2005 | Reiley |
| 6,863,691 B2 | 3/2005 | Short et al. |
| 6,875,222 B2 | 4/2005 | Long et al. |
| 6,875,236 B2 | 4/2005 | Reiley |
| 6,926,739 B1 | 8/2005 | O'Connor et al. |
| 6,939,380 B2 | 9/2005 | Guzman |
| 6,942,670 B2 | 9/2005 | Heldreth et al. |
| 6,964,663 B2 | 11/2005 | Grant et al. |
| 7,001,394 B2 | 2/2006 | Gundlapalli et al. |
| 7,011,687 B2 | 3/2006 | Deffenbaugh et al. |
| 7,025,790 B2 | 4/2006 | Parks et al. |
| 7,163,541 B2 | 1/2007 | Ek |
| 7,238,190 B2 | 7/2007 | Schon et al. |
| 7,252,684 B2 | 8/2007 | Dearnaley |
| 7,314,488 B2 | 1/2008 | Reiley |
| 7,323,012 B1 | 1/2008 | Stone et al. |
| 7,476,227 B2 | 1/2009 | Tornier et al. |
| 7,481,814 B1 | 1/2009 | Metzger |
| 7,485,147 B2 | 2/2009 | Papps et al. |
| 7,534,246 B2 | 5/2009 | Reiley et al. |
| 7,534,270 B2 | 5/2009 | Ball |
| 7,615,082 B2 | 11/2009 | Naegerl et al. |
| 7,618,421 B2 | 11/2009 | Axelson, Jr. et al. |
| 7,625,409 B2 | 12/2009 | Saltzman et al. |
| 7,641,697 B2 | 1/2010 | Reiley |
| 7,678,151 B2 | 3/2010 | Ek |
| 7,713,305 B2 | 5/2010 | Ek |
| 7,717,920 B2 | 5/2010 | Reiley |
| 7,763,080 B2 | 7/2010 | Southworth |
| 7,803,158 B2 | 9/2010 | Hayden |
| 7,850,698 B2 | 12/2010 | Straszheim-Morley et al. |
| 7,896,883 B2 | 3/2011 | Ek et al. |
| 7,896,885 B2 | 3/2011 | Miniaci et al. |
| 7,909,882 B2 | 3/2011 | Stinnette |
| 7,914,533 B2 | 3/2011 | Nelson et al. |
| 7,963,996 B2 | 6/2011 | Saltzman et al. |
| 8,002,841 B2 | 8/2011 | Hasselman |
| 8,012,217 B2 | 9/2011 | Strzepa et al. |
| 8,034,114 B2 | 10/2011 | Reiley |
| 8,034,115 B2 | 10/2011 | Reiley |
| 8,048,164 B2 | 11/2011 | Reiley |
| 8,110,006 B2 | 2/2012 | Reiley |
| 8,114,091 B2 | 2/2012 | Ratron et al. |
| 8,128,627 B2 | 3/2012 | Justin et al. |
| 8,167,888 B2 | 5/2012 | Steffensmeier |
| 8,172,850 B2 | 5/2012 | McMinn |
| 8,177,841 B2 | 5/2012 | Ek |
| 8,192,434 B2 | 6/2012 | Huebner et al. |
| 8,268,007 B2 | 9/2012 | Barsoum et al. |
| 8,303,667 B2 | 11/2012 | Younger |
| 8,313,492 B2 | 11/2012 | Wong et al. |
| 8,317,797 B2 | 11/2012 | Rasmussen |
| 8,323,346 B2 | 12/2012 | Tepic |
| 8,337,503 B2 | 12/2012 | Lian |
| 8,361,159 B2 | 1/2013 | Ek |
| 8,366,559 B2 | 2/2013 | Papenfuss et al. |
| 8,430,879 B2 | 4/2013 | Stoneburner et al. |
| 8,475,463 B2 | 7/2013 | Lian |
| 8,491,596 B2 | 7/2013 | Long et al. |
| 8,498,744 B2 | 7/2013 | Odermatt et al. |
| 8,579,980 B2 | 11/2013 | DeLurio et al. |
| 8,715,362 B2 | 5/2014 | Reiley et al. |
| 8,808,297 B2 | 8/2014 | Stemniski et al. |
| 8,808,303 B2 | 8/2014 | Stemniski et al. |
| 8,828,002 B2 | 9/2014 | Lesinski et al. |
| 8,911,444 B2 | 12/2014 | Bailey |
| 9,259,250 B2 | 2/2016 | Saravia et al. |
| 9,314,251 B2 * | 4/2016 | Aram .................. A61B 17/155 |
| 9,326,781 B2 | 5/2016 | Lannotti et al. |
| 9,402,640 B2 | 8/2016 | Reynolds et al. |
| 9,480,571 B2 | 11/2016 | McGinley et al. |
| 9,492,281 B2 | 11/2016 | Rouyer et al. |
| 9,566,075 B2 | 2/2017 | Carroll et al. |
| 9,603,665 B2 | 3/2017 | Bowling et al. |
| 9,629,726 B2 | 4/2017 | Reiley et al. |
| 9,629,730 B2 | 4/2017 | Reiley |
| 9,675,365 B2 | 6/2017 | Lancianese et al. |
| 9,907,561 B2 | 3/2018 | Luna et al. |
| 9,918,724 B2 | 3/2018 | Luna et al. |
| 9,949,747 B2 | 4/2018 | Stemniski et al. |
| 10,034,678 B2 | 7/2018 | Park et al. |
| 10,039,558 B2 | 8/2018 | Park et al. |
| 10,111,674 B2 | 10/2018 | Crainich et al. |
| 10,136,904 B2 | 11/2018 | McGinley et al. |
| 10,149,687 B2 | 12/2018 | McGinley et al. |
| 10,182,832 B1 | 1/2019 | Saltzman et al. |
| 10,206,688 B2 | 2/2019 | Park et al. |
| 10,213,309 B2 | 2/2019 | Lindsey et al. |
| 10,413,308 B2 * | 9/2019 | Stemniski .............. A61B 17/15 |

(56) References Cited

U.S. PATENT DOCUMENTS

| | | |
|---|---|---|
| 10,743,999 B2 | 8/2020 | Reiley |
| 10,940,012 B2 | 3/2021 | Sander et al. |
| 11,013,520 B2 | 5/2021 | Gareiss et al. |
| 11,399,850 B2* | 8/2022 | Stemniski ........... A61B 17/1796 |
| 11,931,048 B2* | 3/2024 | Insinna ................ A61B 17/152 |
| 2002/0068977 A1 | 6/2002 | Jackson |
| 2002/0082607 A1 | 6/2002 | Heldreth et al. |
| 2002/0133164 A1 | 9/2002 | Williamson |
| 2002/0173853 A1 | 11/2002 | Corl, III et al. |
| 2002/0183760 A1* | 12/2002 | McGovern .......... A61B 17/1764 606/88 |
| 2003/0208280 A1 | 11/2003 | Tohidi |
| 2003/0236522 A1 | 12/2003 | Long et al. |
| 2004/0030399 A1 | 2/2004 | Asencio |
| 2004/0039394 A1 | 2/2004 | Conti et al. |
| 2004/0068322 A1 | 4/2004 | Ferree |
| 2004/0129125 A1 | 7/2004 | Colquhoun |
| 2004/0167631 A1 | 8/2004 | Luchesi et al. |
| 2004/0186585 A1 | 9/2004 | Feiwell |
| 2004/0193268 A1 | 9/2004 | Hazebrouck |
| 2004/0216259 A1 | 11/2004 | Ponziani |
| 2004/0236431 A1 | 11/2004 | Sekel |
| 2005/0004676 A1 | 1/2005 | Schon et al. |
| 2005/0165408 A1 | 7/2005 | Puno et al. |
| 2005/0192588 A1* | 9/2005 | Garcia ................ A61B 17/155 606/88 |
| 2005/0192674 A1 | 9/2005 | Ferree |
| 2005/0267481 A1 | 12/2005 | Carl et al. |
| 2006/0009857 A1 | 1/2006 | Gibbs et al. |
| 2006/0020345 A1 | 1/2006 | O'Connor et al. |
| 2006/0036257 A1 | 2/2006 | Steffensmeier |
| 2006/0085005 A1 | 4/2006 | Kenealy, III et al. |
| 2006/0116679 A1 | 6/2006 | Lutz et al. |
| 2006/0142870 A1 | 6/2006 | Robinson et al. |
| 2006/0229730 A1 | 10/2006 | Reiley et al. |
| 2006/0235541 A1 | 10/2006 | Hodorek |
| 2006/0247788 A1 | 11/2006 | Ross |
| 2007/0038303 A1 | 2/2007 | Myerson et al. |
| 2007/0100346 A1 | 5/2007 | Wyss et al. |
| 2007/0112431 A1 | 5/2007 | Kofoed |
| 2007/0162025 A1 | 7/2007 | Tornier et al. |
| 2007/0173944 A1 | 7/2007 | Keller et al. |
| 2007/0173947 A1 | 7/2007 | Ratron |
| 2007/0213830 A1 | 9/2007 | Ammann et al. |
| 2007/0233129 A1 | 10/2007 | Bertagnoli et al. |
| 2007/0276400 A1 | 11/2007 | Moore et al. |
| 2007/0288030 A1 | 12/2007 | Metzger et al. |
| 2008/0015602 A1 | 1/2008 | Axelson |
| 2008/0097617 A1 | 4/2008 | Fellinger et al. |
| 2008/0103603 A1 | 5/2008 | Hintermann |
| 2008/0109081 A1 | 5/2008 | Bao et al. |
| 2008/0195233 A1 | 8/2008 | Ferrari et al. |
| 2008/0215156 A1 | 9/2008 | Duggal et al. |
| 2008/0287954 A1 | 11/2008 | Kunz et al. |
| 2008/0312745 A1 | 12/2008 | Keller et al. |
| 2009/0024131 A1 | 1/2009 | Metzger et al. |
| 2009/0043309 A1 | 2/2009 | Rasmussen |
| 2009/0043310 A1 | 2/2009 | Rasmussen |
| 2009/0054992 A1 | 2/2009 | Landes et al. |
| 2009/0082875 A1 | 3/2009 | Long |
| 2009/0088753 A1* | 4/2009 | Aram ................... A61B 17/157 606/79 |
| 2009/0088759 A1* | 4/2009 | Aram ................... A61B 17/1764 606/88 |
| 2009/0105767 A1 | 4/2009 | Reiley |
| 2009/0105840 A1 | 4/2009 | Reiley |
| 2009/0182433 A1 | 7/2009 | Reiley et al. |
| 2009/0198341 A1 | 8/2009 | Choi et al. |
| 2009/0234360 A1 | 9/2009 | Alexander |
| 2009/0276052 A1 | 11/2009 | Regala et al. |
| 2010/0010493 A1 | 1/2010 | Dower |
| 2010/0023066 A1 | 1/2010 | Long et al. |
| 2010/0023126 A1 | 1/2010 | Grotz |
| 2010/0042215 A1 | 2/2010 | Stalcup et al. |
| 2010/0057216 A1 | 3/2010 | Gannoe et al. |
| 2010/0069910 A1 | 3/2010 | Hasselman |
| 2010/0198355 A1 | 8/2010 | Kofoed et al. |
| 2010/0212138 A1 | 8/2010 | Carroll et al. |
| 2010/0241237 A1 | 9/2010 | Pappas |
| 2010/0256773 A1 | 10/2010 | Thijs et al. |
| 2010/0262150 A1* | 10/2010 | Lian .................... A61B 17/15 606/103 |
| 2010/0305572 A1 | 12/2010 | Saltzman et al. |
| 2010/0318088 A1 | 12/2010 | Warne et al. |
| 2010/0331984 A1 | 12/2010 | Barsoum et al. |
| 2011/0029090 A1 | 2/2011 | Zannis et al. |
| 2011/0035018 A1 | 2/2011 | Deffenbaugh et al. |
| 2011/0035019 A1 | 2/2011 | Goswami et al. |
| 2011/0071645 A1 | 3/2011 | Bojarski et al. |
| 2011/0106268 A1 | 5/2011 | Deffenbaugh et al. |
| 2011/0112542 A1 | 5/2011 | Gross |
| 2011/0125200 A1 | 5/2011 | Hanson et al. |
| 2011/0125275 A1 | 5/2011 | Lipman et al. |
| 2011/0125284 A1 | 5/2011 | Gabbrielli et al. |
| 2011/0152868 A1 | 6/2011 | Kourtis et al. |
| 2011/0152869 A1 | 6/2011 | Ek et al. |
| 2011/0166608 A1 | 7/2011 | Duggal et al. |
| 2011/0190829 A1 | 8/2011 | Duggal et al. |
| 2011/0218542 A1 | 9/2011 | Lian |
| 2011/0245835 A1 | 10/2011 | Dodd et al. |
| 2011/0253151 A1 | 10/2011 | Tochigi et al. |
| 2011/0276052 A1 | 11/2011 | Hasselman |
| 2011/0295380 A1 | 12/2011 | Long |
| 2012/0010718 A1 | 1/2012 | Stil |
| 2012/0046753 A1 | 2/2012 | Cook et al. |
| 2012/0053591 A1 | 3/2012 | Haines et al. |
| 2012/0053644 A1 | 3/2012 | Landry et al. |
| 2012/0083789 A1 | 4/2012 | Blakemore et al. |
| 2012/0109131 A1 | 5/2012 | Vasarhelyi et al. |
| 2012/0109326 A1 | 5/2012 | Perler |
| 2012/0130376 A1 | 5/2012 | Loring et al. |
| 2012/0136443 A1 | 5/2012 | Wenzel |
| 2012/0185057 A1 | 7/2012 | Abidi et al. |
| 2012/0191210 A1 | 7/2012 | Ratron et al. |
| 2012/0239045 A1* | 9/2012 | Li ....................... A61B 17/157 606/88 |
| 2012/0245701 A1 | 9/2012 | Zak et al. |
| 2012/0271314 A1* | 10/2012 | Stemniski .......... A61B 17/1775 606/87 |
| 2012/0271430 A1 | 10/2012 | Arnett et al. |
| 2012/0277745 A1 | 11/2012 | Lizee |
| 2013/0041473 A1 | 2/2013 | Rouyer et al. |
| 2013/0116797 A1 | 5/2013 | Coulange et al. |
| 2014/0020690 A1 | 1/2014 | Triplett |
| 2014/0039565 A1 | 2/2014 | Martineau et al. |
| 2014/0163570 A1 | 6/2014 | Reynolds et al. |
| 2014/0236157 A1 | 8/2014 | Tochigi et al. |
| 2014/0276853 A1 | 9/2014 | Long et al. |
| 2014/0296995 A1 | 10/2014 | Reiley et al. |
| 2014/0309640 A1 | 10/2014 | Smith et al. |
| 2014/0336658 A1 | 11/2014 | Luna et al. |
| 2015/0045801 A1 | 2/2015 | Axelson et al. |
| 2015/0190145 A1* | 7/2015 | Aram .................... A61B 17/155 606/88 |
| 2015/0257900 A1 | 9/2015 | Dees, Jr. |
| 2015/0374388 A1* | 12/2015 | Aram .................... A61B 17/157 606/88 |
| 2016/0135815 A1 | 5/2016 | Loring et al. |
| 2016/0135857 A1 | 5/2016 | Marrero, Sr. |
| 2016/0361071 A1 | 12/2016 | Mahfouz |
| 2016/0367371 A1 | 12/2016 | De Beaubien et al. |
| 2017/0189198 A1 | 7/2017 | Reiley et al. |
| 2017/0215896 A1* | 8/2017 | Stemniski .......... A61B 17/1775 |
| 2017/0325826 A1 | 11/2017 | Bake et al. |
| 2018/0146970 A1 | 5/2018 | Luna et al. |
| 2018/0177511 A1 | 6/2018 | Luna et al. |
| 2018/0177513 A1* | 6/2018 | Stemniski .......... A61B 17/1796 |
| 2018/0177523 A1 | 6/2018 | Piron et al. |
| 2018/0185033 A1* | 7/2018 | Fritzinger .......... A61B 17/1764 |
| 2018/0263639 A1 | 9/2018 | McGinley et al. |
| 2019/0059917 A1 | 2/2019 | Saltzman |
| 2019/0059918 A1 | 2/2019 | Saltzman et al. |
| 2019/0076261 A1 | 3/2019 | Mutchler et al. |
| 2019/0133612 A1 | 5/2019 | McGinley |

(56) References Cited

U.S. PATENT DOCUMENTS

| | | | |
|---|---|---|---|
| 2019/0150957 | A1 | 5/2019 | Wilkinson |
| 2019/0350717 | A1 | 11/2019 | Tuttle |
| 2020/0046374 | A1 | 2/2020 | Luttrell et al. |
| 2020/0060739 | A1* | 2/2020 | Nachtrab ............... A61B 17/15 |
| 2020/0297353 | A1 | 9/2020 | Bomar et al. |
| 2021/0113222 | A1* | 4/2021 | Khatibi ................ A61F 2/4606 |
| 2022/0316504 | A1 | 10/2022 | Kubacki |

FOREIGN PATENT DOCUMENTS

| | | |
|---|---|---|
| EP | 2967697 | 4/2018 |
| EP | 3354233 | 10/2019 |
| GB | 2480846 | 12/2011 |
| JP | H11-500035 | 1/1999 |
| JP | 2006150055 | 6/2006 |
| JP | 2007508123 | 4/2007 |
| JP | 2007518453 | 7/2007 |
| JP | 2007519477 | 7/2007 |
| JP | 2007536011 | 12/2007 |
| JP | 2009148597 | 7/2009 |
| JP | 2011526189 | 10/2011 |
| JP | 2012518517 | 8/2012 |
| JP | 2013500810 | 1/2013 |
| JP | 2013511358 | 4/2013 |
| JP | 5412334 | 2/2014 |
| JP | 2014131738 | 7/2014 |
| WO | WO 9625106 | 8/1996 |
| WO | 0166021 A1 | 9/2001 |
| WO | 2005011523 A2 | 2/2005 |
| WO | WO 2005037135 | 4/2005 |
| WO | 2006023824 | 3/2006 |
| WO | WO 2006022923 | 3/2006 |
| WO | 2006099270 | 9/2006 |
| WO | 2007084846 | 7/2007 |
| WO | WO 2009143374 | 11/2009 |
| WO | 2009158522 | 12/2009 |
| WO | 2010099142 | 9/2010 |
| WO | WO 2010135156 | 11/2010 |
| WO | 2011015863 | 2/2011 |
| WO | WO 2011063281 | 5/2011 |
| WO | 2011151657 | 12/2011 |
| WO | WO 2012088036 | 6/2012 |
| WO | WO 2012116089 | 8/2012 |
| WO | WO 2012158917 | 11/2012 |
| WO | WO 2013169475 | 11/2013 |
| WO | WO 2014152535 | 9/2014 |
| WO | WO 2014165060 | 10/2014 |
| WO | WO 2015167581 | 11/2015 |
| WO | WO 2016005722 | 1/2016 |
| WO | WO 2016039762 | 3/2016 |
| WO | WO 2016148675 | 9/2016 |
| WO | WO 2016181168 | 11/2016 |
| WO | 2019137626 A1 | 7/2019 |
| WO | WO-2020170021 A1 * | 8/2020 ........... A61B 17/152 |

OTHER PUBLICATIONS

Search report issued for European U.S. Appl. No. 13/198,280 dated Feb. 5, 2014.
International Search Report for International patent application No. PCT/US2014/027448 dated Jul. 7, 2014.
International Preliminary Report on Patentability issued for International patent application No. PCT/US2014/027448, Sep. 15, 2015, 8 pages.
Partial European Search Report issued in connection with European patent application No. 14768333.8, Oct. 26, 2016, 6 pages.
Patent Examination Report No. 1 issued in connection with Australian patent application No. 2015202080, Jul. 5, 2016, 4 pages.
First Office Action issued for Japanese patent application No. 2016-117842, Sep. 12, 2017, 5 pages.
First Office Action issued in connection with corresponding Japanese Patent Application No. 2020-016447, Apr. 6, 2021, 4 pages.
Office Action in corresponding Canadian Patent Application No. 2,904,652, Jun. 2, 2020, 6 pages.
First Examination Report issued in corresponding Australian Patent Application No. 2019213412, Sep. 3, 2020, 5 pages.
First Office Action in corresponding Canadian Patent Application No. 2,904,652, Jan. 28, 2020, 5 pages.
Final Office Action issued in connection with corresponding Japanese Patent Application No. 206-502443, May 15, 2018, 3 pages.
Extended European Search Report issued in connection with corresponding European Patent Application No. 18160378.8, Jun. 29, 2018, 7 pages.
Second Office Action issued in connection with corresponding Chinese Patent Application No. 2018071101785100, dated Jul. 16, 2016, 6 pages.
First Office Action in corresponding Japanese Patent Application No. 2018-178853, Sep. 3, 2018, 3 pages.
Examination Report No. 1 issued in connection with corresponding Australian Patent Application No. 20182000073, Dec. 24, 2018, 3 pages.
First Office Action issued in connection with corresponding Japanese Patent Application No. 2018-092289, Mar. 5, 2019, 2 pages.
Extended European Search Report and Opinion in connection with European Patent Application No. 14768333.8, dated Jan. 30, 2017, 10 pages.
First Office Action issued in connection with Chinese Patent Application No. 2017800899442 dated Apr. 6, 2022, 8 pages.
International Search Report and Written Opinion issued in connection with International Patent Application No. PCT/US2021/025873, Sep. 2, 2021.
Orthopedic Designs North America, Inc., http://odi-na.com/?service=talon-distalfix- fermoral-nail-system, accessed via Internet, Jul. 22, 2022.
Arthrex, "Arthrex—Intramedullary Nails," https://ww.arthrex.com/foot-ankle/intramedullary-nails, accessed via Internet, Jul. 22, 2022.
Inbone II Total Ankle Surgical Technique, Wright Medical Technology, Inc., Mar. 12, 2014, 64 pages.
Infinity Total Ankle System Surgical Technique, Wright Medical Techology, Inc., Aug. 8, 2015, 76 pages.
First Examination Report issued in connection with Australian Patent Application No. 2020277219, Nov. 19, 2021, 7 pages.
International Search Report and Written Opinion issued in connection with International Patent Application No. PCT/US2016/023729, Feb. 14, 2017, 14 pages.
First Examination Report issued in connection with Australian Patent Application No. 2019246766, Apr. 17, 2020, 9 pages.
Supplementary European Search Report issued in connection with corresponding European No. 16895669.6 Oct. 21, 2019, 6 pages.
Office Action in connection with corresponding Canadian Patent Application No. 3,014,284, Jun. 17, 2019, 4 pages.
First Examination issued in connection with Australian Patent Application No. 2016398429, Jan. 21, 2019, 4 pages.
International Search Report and Written Opinion issued in connection with International Patent Application No. PCT/US2021/071308, Dec. 27, 2021, 10 pages.
Prophecy Inbone Preoperative Navigation Guides Surgical Technique, Wright Medical Technology, Inc., 64 pages.
Sidekick Coretrak Tube Fixator, Wright Medical Technology, Inc., 8 pages.
Extended European Search Report issued in connection with European Patent Application No. 22185245.2, Nov. 28, 2022, 9 pages.
International Search Report and Written Opinion issued in connection with International Patent Application No. PCT/US2021/057014, Mar. 17, 2022, 19 pages.
Infinity Total Ankle System, Tibial Spader Guide Surgical Technique. Document [online]. Wright, Oct. 4, 2019 [retrieved on Apr. 25, 2022]. Retrieved from the Internet: < URL:https://www.wrightmedia.com/ProductFiles/Files/PDFs/AP-012815_EN_LR_LE.pdf>.

* cited by examiner

SURGICAL GUIDE WITH CUTTING DEPTH INFORMATION

CROSS-REFERENCE TO RELATED APPLICATION

This application is a National Stage Application, filed under 35 U.S.C. 371, of International Patent Application No. PCT/US2022/070144, filed on Jan. 12, 2022, which claims priority to U.S. Provisional Patent Application No. 63/146,020, filed Feb. 5, 2021, the entire contents of which are incorporated herein by reference.

BACKGROUND

A primary ankle replacement surgery can correct misalignments, deformities, and other issues of the ankle joint. A primary ankle replacement surgery can include replacement of portions of one or more of the bones of the ankle with one or more implants. To facilitate removal of a portion of the bone, a guide can be used to guide a cutting tool to remove a portion of the bone such that the bone is prepared to receive an implant.

Removing the ankle bone fragments is a precise maneuver requiring cutting into the ankle joint to a blind depth. Tactile feedback and concentration are required to perform this maneuver today. Additional feedback and controls of this depth are desired in all steps.

SUMMARY

Disclosed herein are various embodiments of a novel patient-specific cutting guide that is useful for guiding a cutting tool during a bone cutting procedure. The cutting guide provides multiple modes of depth controlled cutting and sculpting. Using the guide, a guided bone cutting can be performed where the depth of the cut into the bone can be made to correspond to the varying bone depth that is defined by the contour of the surface of the bone toward which the distal end of the cutting tool is advancing during the cutting.

Provided is a custom guide which matches patient derived CT scans to provide an instrumented indication of depth for cutting tools at a patient-specific depth profile that is useful in performing bone resections at the distal end of a tibia for receiving total ankle replacement prosthesis.

In one aspect, a guide for use in cutting a bone is disclosed, wherein the bone has a first bone surface and a second bone surface, wherein a varying bone depth is defined between the first bone surface and the second bone surface. The guide comprises: a bone contacting surface comprising a contour that is complementary to a contour of the first bone surface such that the bone contacting surface conformably mates with the first bone surface when placed against the first bone surface; a guide surface spaced apart from the bone contacting surface and provided thereon with at least one prescribed patient-specific depth of cut information in correspondence with the varying bone depth; and at least one aperture extending through the guide from the guide surface, wherein the aperture is configured to receive and guide a cutting tool for cutting the bone. When the guide is placed on the bone against the first bone surface, the at least one aperture extends through the guide from the guide surface towards the second bone surface.

In a guide for use in cutting a bone according to another embodiment, the first bone surface and the second bone surface of the bone are on opposite sides of the bone and a varying bone depth is defined between the first bone surface and the second bone surface. The guide comprises: a bone contacting surface comprising a contour that is complementary to a contour of the first bone surface such that the bone contacting surface conformably mates with the first bone surface when placed against the first bone surface; a guide surface spaced apart from the bone contacting surface and provided thereon with at least one prescribed patient-specific depth of cut information in correspondence with the varying bone depth; and at least one aperture extending through the guide from the guide surface to the bone contacting surface, wherein the aperture is configured to receive and guide a cutting tool for cutting the bone. When the guide is placed on the bone against the first bone surface, the at least one aperture extends through the guide from the guide surface towards the second bone surface.

In another aspect, a kit for use in removing a portion of a bone is disclosed, wherein the bone has a first bone surface and a second bone surface, wherein a varying bone depth is defined between the first bone surface and the second bone surface. The kit comprises: a guide comprising: a bone contacting surface comprising a contour that is complementary to a contour of the first bone surface such that the bone contacting surface conformably mates with the first bone surface when placed against the first bone surface; a guide surface spaced apart from the bone contacting surface and provided thereon with at least one prescribed patient-specific depth of cut information in correspondence with the varying bone depth; and at least one aperture extending through the guide, wherein the aperture is configured to receive and guide a cutting tool for cutting the bone; and a cutting tool comprising: an elongated body having a first end and a second end; a cutting tip provided at the first end. When the guide is placed on the bone against the first bone surface, the at least one aperture extends through the guide from the guide surface towards the second bone surface.

In another aspect, a method for cutting bone is provided. The bone has a first bone surface and a second bone surface, wherein a varying bone depth is defined between the first bone surface and the second bone surface. The method comprises: (a) placing a guide against the first bone surface, wherein the guide comprises: a bone contacting surface comprising a contour that is complementary to a contour of the first bone surface such that the bone contacting surface conformably mates with the first bone surface when placed against the first bone surface; a guide surface spaced apart from the bone contacting surface and provided thereon with at least one prescribed patient-specific depth of cut information in correspondence with the varying bone depth; and at least one aperture extending through the guide from the guide surface toward the second bone surface; and (b) inserting a cutting tool having an elongated body through the at least one aperture at a first location; and (c) cutting into the bone from the first bone surface toward the second bone surface to a depth that is indicated by the prescribed patient-specific depth of cut information corresponding to the first location.

BRIEF DESCRIPTION OF DRAWINGS

The features of the embodiments described herein will be more fully disclosed in the following detailed description, which is to be considered together with the accompanying drawings wherein like numbers refer to like parts.

DETAILED DESCRIPTION

Figure 1:
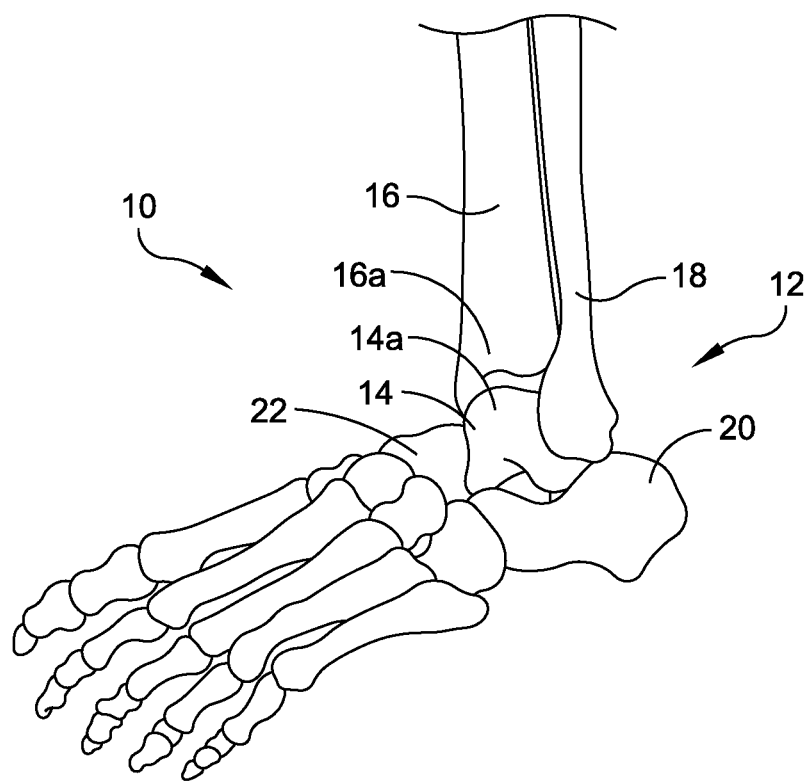
FIG. 1 is a schematic illustration of a human ankle skeletal structure.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The present disclosure relates to cut guides for use in surgical procedures. The cut guides described herein are particularly well-suited for use in ankle replacement surgeries, however, this disclosure is not limited to ankle procedures and it should be understood that the cut guides described herein can be used in surgical procedures related to any joint or bone. The cut guides described herein have a depth that corresponds to the depth of the bone such that the cut guide can be used to guide a cutting tool and control its depth in the bone. This may prevent the cutting tool from being inserted farther into the bone than desired and reduce the risk of damaging tissue on the back side of the bone.

The disclosed systems and methods can be used in replacement procedure for an ankle joint 12 (shown in FIG. 1). Examples of primary ankle techniques using patient-specific surgical jigs and fixtures are described in U.S. Pat. No. 9,907,561, issued on Mar. 6, 2018, entitled "Ankle Replacement System and Method" and U.S. Pat. No. 8,808,303, issued on Aug. 19, 2014 and entitled "Orthopedic Surgical Guide," each of which is incorporated by reference herein in its entirety.

Although the following description of the custom patient-specific instruments are described with respect to a tibia 16 associated with a foot 10 and an ankle 12 (FIG. 1), one of ordinary skill in the art will understand that the systems and methods may be utilized in connection with other bones in other joints including, but not limited to, knees, hips, shoulders, and the like. As shown in FIG. 1, a typical human ankle 10 includes an ankle joint 12 formed between a talus 14, which is disposed on a calcaneus 20, a tibia 16, a fibula 18, and a navicular 22. The tibia 16 includes an anterior surface 30 on the anterior side of the tibia 16 and a posterior surface 32 on the posterior side of the tibia 16 (i.e., the side opposite the anterior surface 30). As shown, for example, in FIG. 2B, the distance 52 between the anterior surface 30 and the posterior surface 32 varies over the contour of the two surfaces. Because of the 3-D nature of the tibia, the distance 52 between the anterior surface 30 and the posterior surface 32 will vary from point to point along the anterior surface 30. This varying distance 52 between the anterior surface 30 and the posterior surface 32 will be referred to herein as the "varying bone depth." Therefore when a cut is to be made into the tibia from the anterior surface to the posterior surface, the depth of the cut that is required to reach the cortical bone on the posterior surface will vary. When making a cut in the tibia 16 to remove a portion of the tibia 16, this variation in required depth of cut can make it difficult to ensure that the cutting tool is cutting fully through the bone, while at the same time not to cut too deeply such that soft tissue adjacent to the posterior surface 32 of the tibia 16 is damaged.

During a primary and/or a revision surgery, a CT or MRI scanned image or series of images may be taken of a patient's ankle 12 (or other joint) and then converted from, e.g., a DICOM image format, to a solid computer model of the ankle including the calcaneus, talus, tibia, navicular, and fibula to determine implant alignment, type, and sizing using specialized modeling methods that are often embodied in computer software. Computer generated models (e.g., CAD models) that are derived from the data of the CT or MRI scan image will often include precise and accurate information regarding the surface contours surrounding the structures that have been imaged, e.g., the surface topography of the bones or contour of connected tissue (e.g., fascia, cartilage, etc.) that have been imaged. Imaging and generation of patient-specific implants is further described in U.S. Pat. No. 5,768,134, issued on Jun. 16, 1998, entitled "Method for Making a Perfected Medical Model on the Basis of Digital Image Information of a Part of the Body," which is incorporated herein by reference in its entirety. In some embodiments, the CT and/or MRI scan image includes foreign bodies, such as one or more implants previously installed in the joint 12 during a primary replacement surgery, as described in greater detail in International Patent Application No. PCT/US15/20414, which published as WO 2016/

148675, which is incorporated herein in its entirety. It will be understood that by surface topography it is meant the location, shape, size and distribution of surface features such as concavities and prominences or the like.

Provided herein are various embodiments of a patient-specific cutting guide whose form is fabricated based on the CT or MRI images of the patient's bone, such as the tibia and the talus in the patient's ankle, so that the cutting guides can guide a cutting tool and control the depth of cut being made into the bone by the cutting tool. The patient-specific cutting guide can be 3D printed based on the CT or MRI image data. The conversion of the CT or MRI data into the input data for 3D printing is already being practiced and is well known in the art.

The guide has multiple modes of depth controlled cutting and sculpting. Using the guide, a guided bone cutting can be performed where the depth of the cut into the bone can be made to correspond to the varying bone depth that is defined by the contour of the surface of the bone toward which the distal end of the cutting tool is advancing during the cutting. The guide comprises a bone contacting surface that has a contour that matches the contour of the surface of a particular portion of the bone on which the guide is intended to be placed and secured before the desired bone cutting can be made. In this disclosure, the surface of the particular portion of the bone on which the guide is intended to be placed and secured is referred to as the "first bone surface" and the surface of the bone toward which the distal end of the cutting tool is advancing during the cutting procedure is referred to as the "second bone surface."

The patient-specific cutting guide can be used to control the depth of cut being made from the first bone surface toward the second bone surface (sometimes breaking through the opposite cortex and other times not). The concept of cutting herein encompasses cutting a bone with an oscillating or reciprocating flat blade, drilling with a drill bit, and sculpting with a burr, such as those performed in procedures such as MIS osteotomy, and bone spur removal surgery, etc. Because the first bone surface and the second bone surface are not parallel flat surfaces, the distance between the two bone surfaces vary over the two surfaces and define a varying bone depth between the two bone surfaces. Such customized patient-specific information defined by the distance between the two surfaces of the patient's bone relevant to the cuts being made into the bone using the cutting guides of the present disclosure will be referred to herein as the "prescribed patient-specific depth of cut information." The prescribed patient-specific depth of cut information will be in correspondence with the varying bone depth. In the various embodiments of the cutting guide disclosed herein, the prescribed patient-specific depth of cut information can be represented on a guide surface of the cutting guide in a physical form as an exact replica, a segmented representation, a graphic representation, or a textured representation, of the contour of the opposing surface of the bone.

The relative position of the first bone surface and the second bone surface will depend on the geometry of the bone involved and the particular cut to be made. This will be illustrated using a hypothetical bone 901 and a hypothetical cutting guide 900 shown in FIG. 2C. In some situations, the cut to be made into a bone 901 using a guide 900 is along the direction denoted by the dotted line A that is generally orthogonal to the first bone surface 911 and extending toward a second bone surface 912a. In that case, the first bone surface 911 and the second bone surface 912a are situated generally on the opposite sides of the bone 901. In some other situations, the cut to be made into the bone 901 using the guide 900 is in the direction denoted by the dotted line B that is at an angle β relative to the first bone surface 911 and extending toward a second bone surface 912b. In some other situations, the cut to be made into the bone 901 using the guide 900 can be along a direction that is between those represented by the dotted lines A and B.

Referring to FIG. 3A-7F, disclosed are various embodiments 100A, 100B, 100C, 100D, 100E for use in cutting a bone according to some embodiments. The embodiments of the guide 100A, 100B, 100C, 100D are configured to be used as a tibia cutting guide in a total ankle replacement procedure. The embodiment of the guide 100E is suitable as a cutting guide for talar resection.

Referring to FIGS. 3A-6B, disclosed herein is a guide 100A, 100B, 100C, 100D for use in cutting a bone according to some embodiments. In this exemplary disclosure a tibia 16 will be used as an example. The bone 16 having a first bone surface 30 and a second bone surface 32 on opposite side of the first bone surface 30, wherein a varying bone depth is defined between the first bone surface 30 and the second bone surface 32. The guide 100A, 100B, 100C, 100D comprises a bone contacting surface 101 comprising a contour that is complementary to the contour of the first bone surface 30 of a particular patient such that the bone contacting surface 101 conformably mates with the first bone surface 30 when placed against the first bone surface 30. The guide also includes a guide surface 103 spaced apart from the bone contacting surface 101 and provided thereon with at least one prescribed patient-specific depth of cut information in correspondence with the varying bone depth, and at least one aperture 122, 125a, 125b extending through the guide from the guide surface 103 to the bone contacting surface 101A. The at least one aperture 122, 125a, 125b is configured to receive and guide a cutting tool for cutting the bone. The cutting tool can be a burr or a flat saw blade. In some embodiments, the flat saw blade can be an oscillating blade. In some embodiments, the flat saw blade can be a reciprocating blade.

Figure 3A:
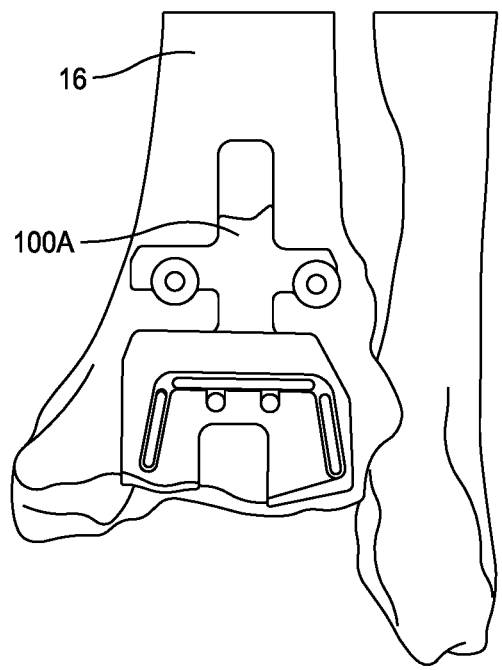
FIGS. 3A-3G are schematic illustrations of a cutting guide according to an embodiment.
Figure 3B:
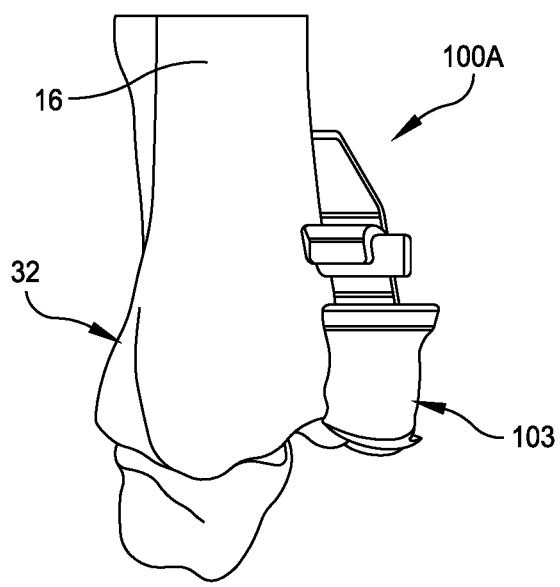
Figure 3C:
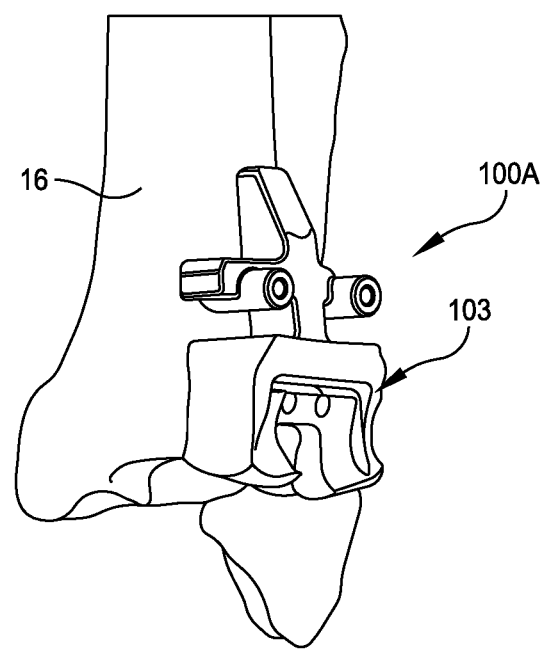
Figure 3D:
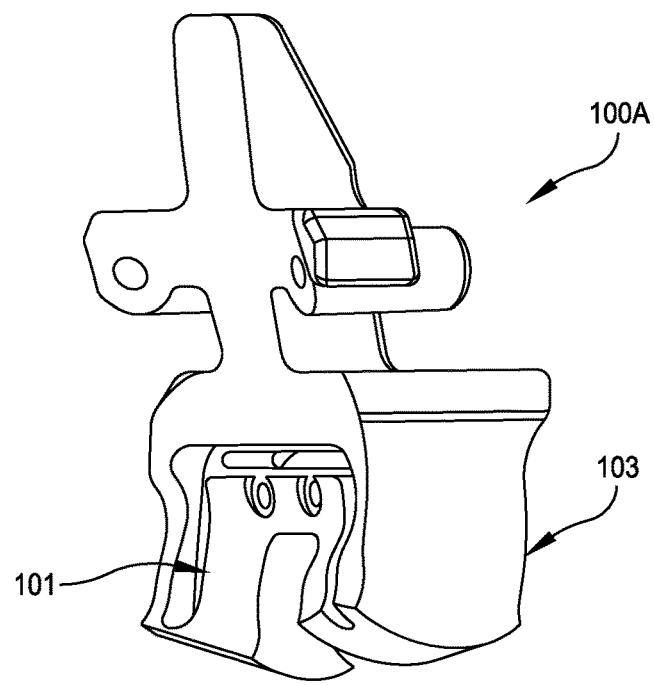
Figure 3E:
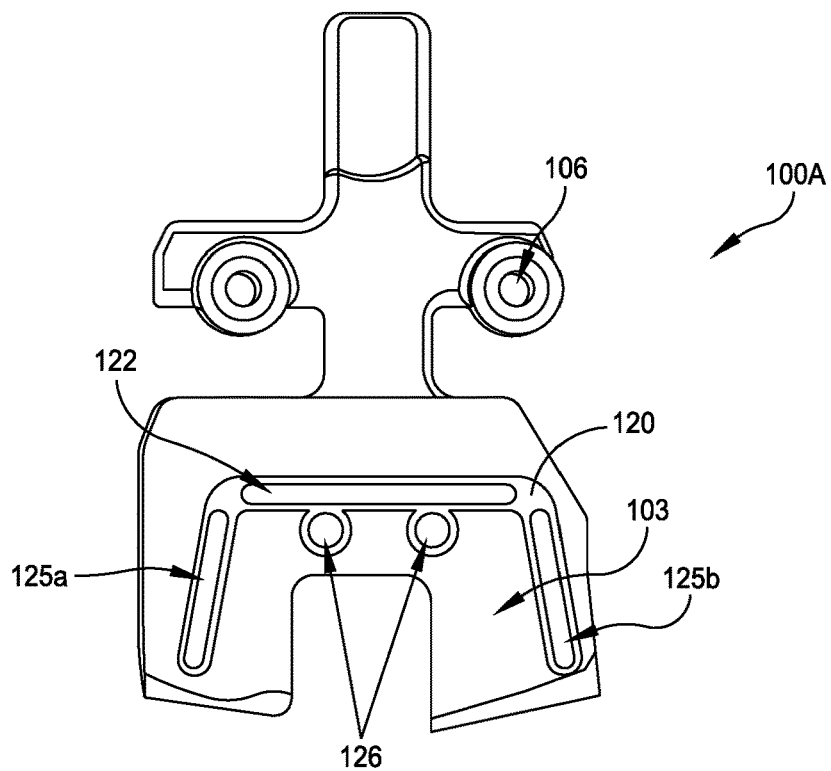
Figure 3F:
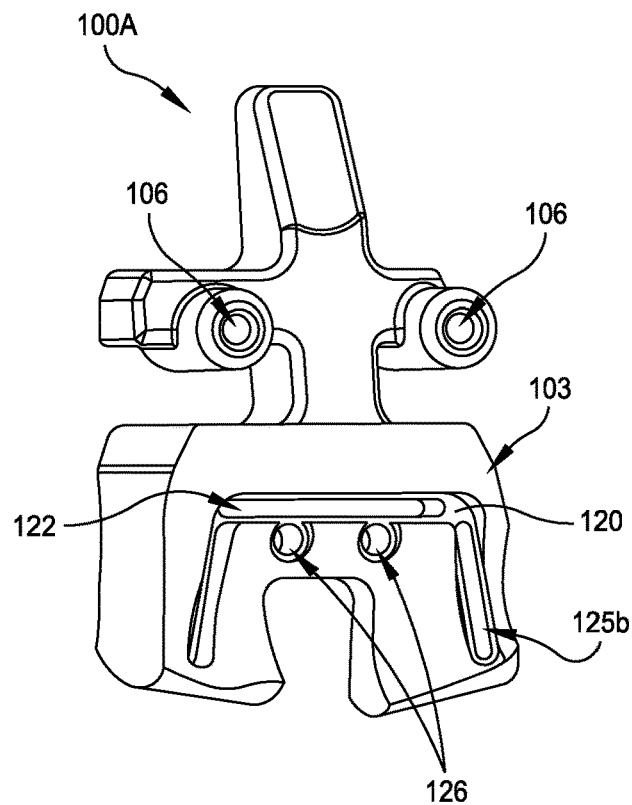
Figure 3G:
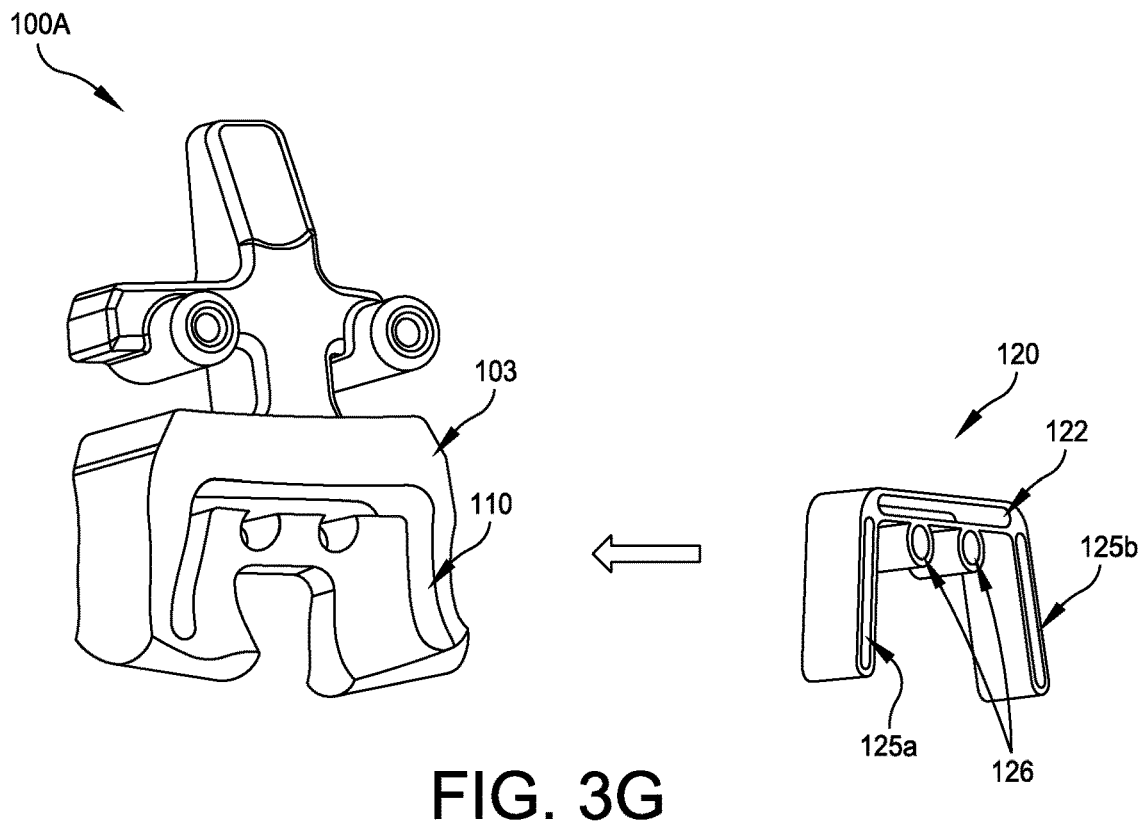

In some embodiments, the at least one prescribed patient-specific depth of cut information is provided in the form of a contoured surface for the guide surface 103 as shown in FIGS. 3E-3G. The continuous contoured surface can interface with a cutting tool such as a flat oscillating saw or a burr equipped with a spherical stop. The contour of the guide surface 103 is configured to be a duplicate of the second bone surface 32 of the patient's bone. Thus, the contour of the guide surface 103 represents the patient-specific depth of cut information.

With the guide embodiment 100A set in place with the bone contacting surface 101 contacting a first bone surface 30, when the cutting tool such as a burr equipped with a spherical stop is plunged through the at least one aperture 122, 125a, 125b to cut the bone, because the spherical stop is wider than the width of the aperture 122, 125a, 125b, the spherical stop gets blocked by the contoured guide surface 103 around the edge of the aperture and limits the depth of the cut being made by the burr. As the burr is moved along the length of the aperture 122, 125a, 125b, using the spherical stop as a stylus riding along the edges of the aperture 122, 125a, 125b, the spherical stop follows the contour of the guide surface 103 along the edge of the aperture 122, 125a, 125b. Thus, the cutting tip of the burr follows the contour of the second bone surface 32 without the risk of the burr cutting too deep.

Figure 4A:
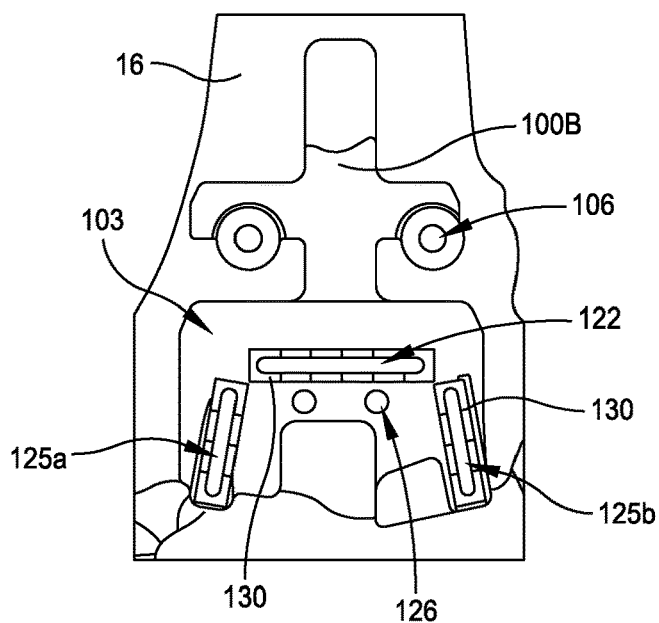
FIGS. 4A-4C are schematic illustrations of a cutting guide according to an embodiment.
Figure 4B:
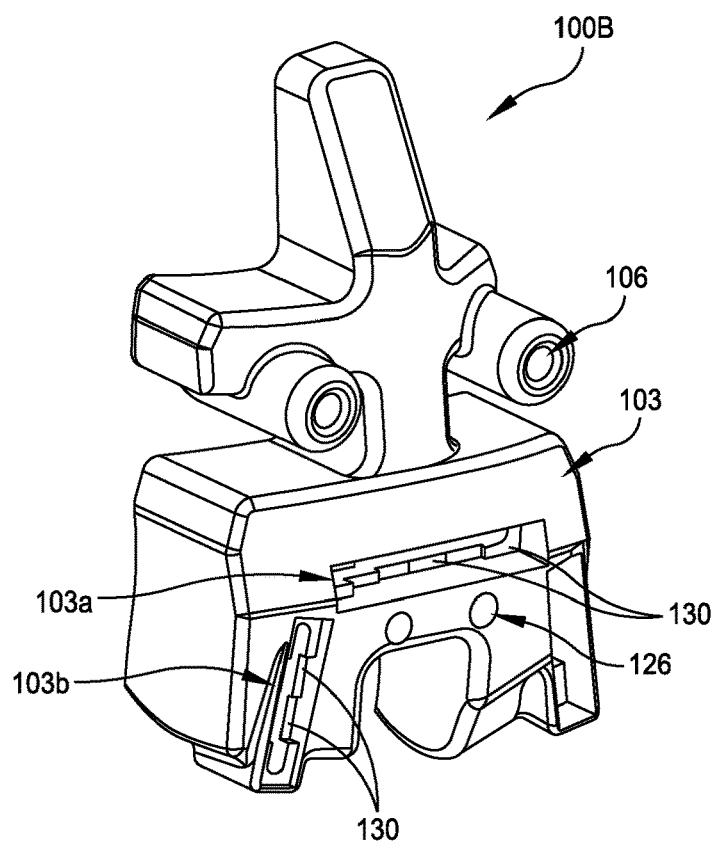
Figure 4C:
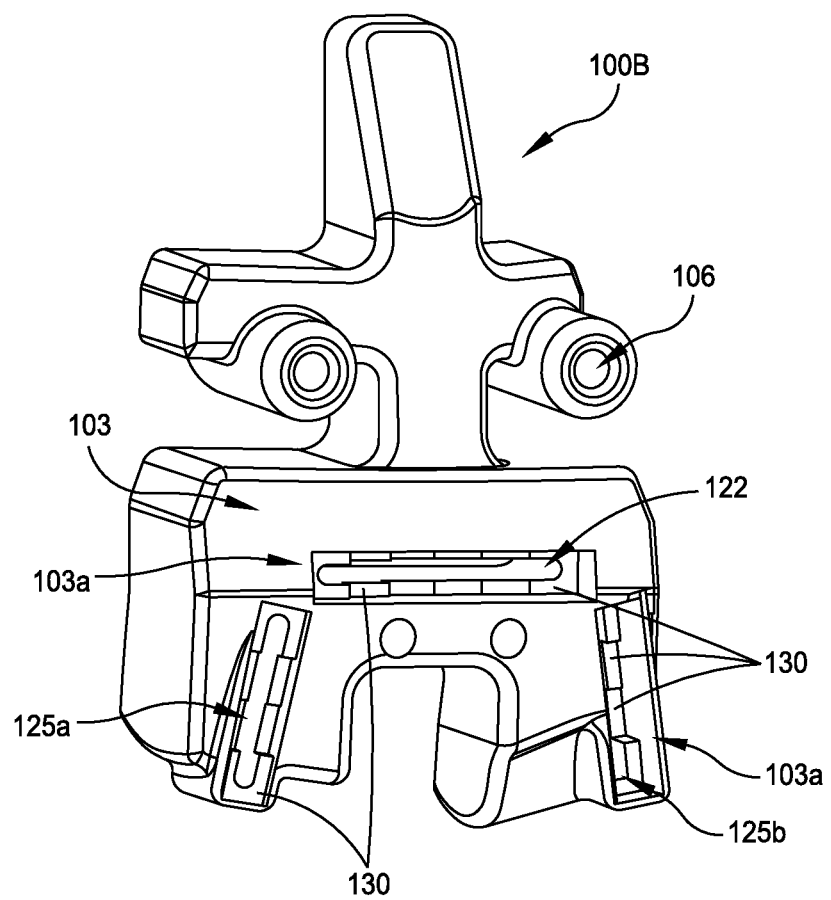

Referring to FIGS. 4A-4B, in a guide embodiment 100B, the at least one prescribed patient-specific depth of cut information is provided in the form of a plurality of discrete surfaces 130. Rather than a continuously contoured guide surface 103 of the guide embodiment 100A, the discrete surfaces 130 represent stepped segmented approximate representation of the contour of the second bone surface 32. Thus, the profile of the depth of the cut made into the bone 16 using this guide embodiment 100B will be a stepped segmented approximation of the contour of the second bone surface 32. In some embodiments, the plurality of discrete surfaces 130 form discrete stepped surfaces along the at least one aperture 122, 125a, 125b. In the example shown in FIGS. 4B-4C, the discrete surfaces 130 for each of the at least one aperture 122, 125a, 125b are provided in a recess 103a. In another embodiment, not shown, the discrete surfaces 130 can be raised above the guide surface 103. In an alternative embodiment, not shown, the guide surface 103 can be covered with discrete surfaces 130 of varied height.

A burr 200A (See FIG. 7A) equipped with a depth stop 206 or an oscillating flat saw blade 200C, 200D (See FIGS. 8A and 8B, respectively) can be used with the guide embodiment 100B also. The flat saw blade 200C comprises a hard depth stop 206C, which can be a bump that protrudes from the flat surface of the blade 200C on both sides. The flat saw blade 200D comprises one or more depth markings 207D provided on the blade. The depth markings 207D can be graduated lines oriented orthogonal to the oscillating motion of the blade so that they would be visible to the surgeon even when the blade is oscillating and serve as a visual cue to assist the surgeon in controlling the cutting depth. In some embodiments, the length of the discrete surfaces 130 can be sized to match the width of the flat saw blade, allowing space for oscillation of the blade during the cutting procedure. This urges the cutting blade into a perpendicular angle with respect to each of the discrete surfaces 130.

Figure 5A:
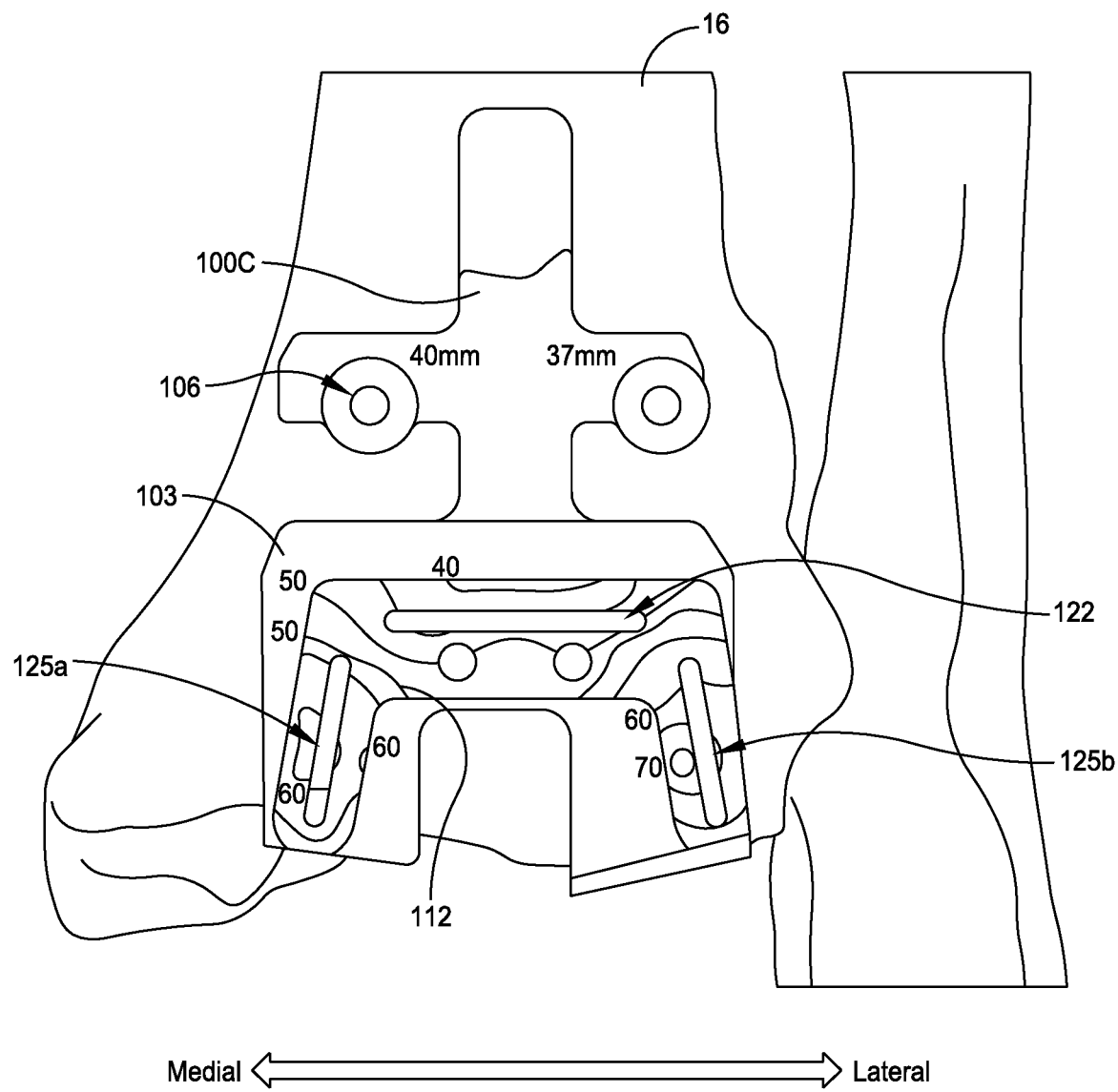
FIGS. 5A-5E are schematic illustrations of a cutting guide according to an embodiment.
Figure 5B:
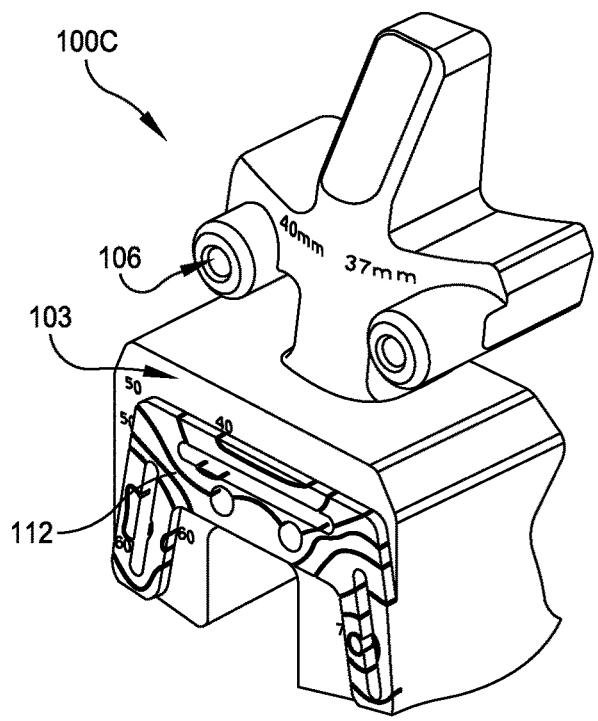
Figure 5C:
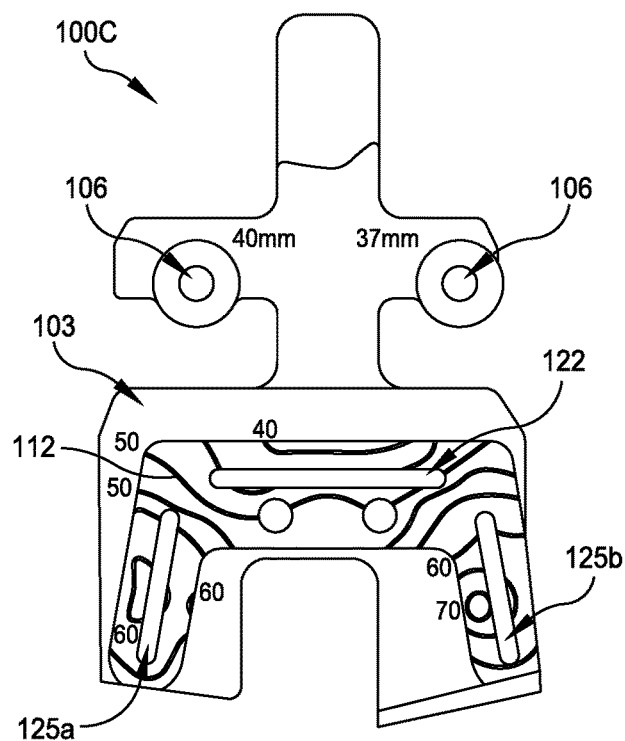
Figure 5D:
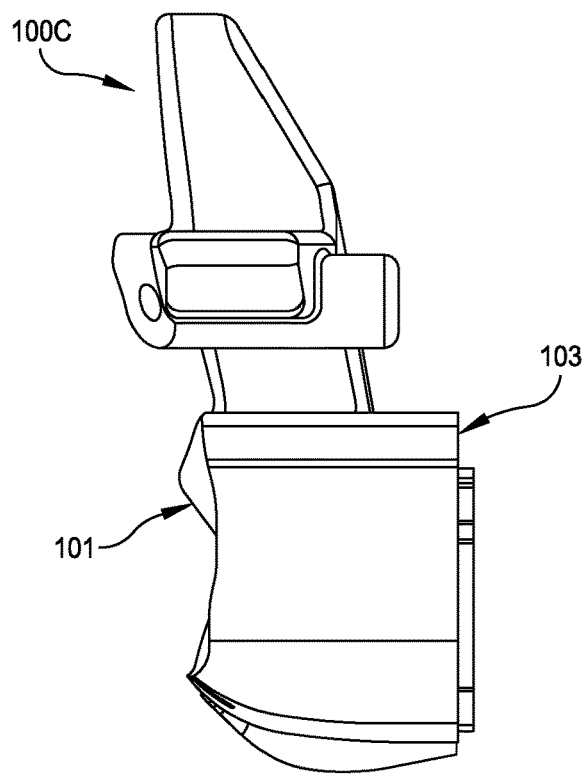
Figure 5E:
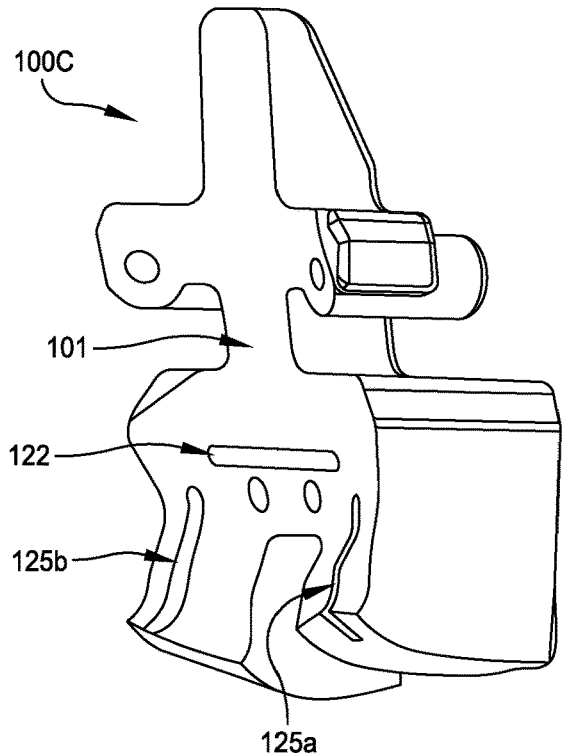

Referring to FIGS. 5A-5E, in a guide embodiment 100C, the at least one prescribed patient-specific depth of cut information is provided in the form of one or more contour lines 112. The contour lines 112 are similar to the contour lines of a topography map in that they represent displacement in the direction orthogonal to the surface on which the contour lines are presented. FIG. 5C is a view of the guide 100C looking straight at the guide surface 103. Each of the contour lines 112 represent a distance to the far side of the patient's bone, i.e., the second bone surface 32, from the guide surface 103, when the guide 100C is attached to the first bone surface 30. As the surgeon plunges a cutting tool into the at least one aperture 122, 125a, 125b, the contour lines 112 around the aperture inform the surgeon how deep the cut can be made before reaching the cortex of the bone on the second bone surface 32, which is the bone surface on the opposite side of the first bone surface 30 to which the guide 100C is attached. The surgeon can then estimate how deep to plunge the cutting tool through the at least one aperture relying on tactile feedback and visual cues. In some embodiments, the cutting tool itself can be provided with markings that provide visual cue as to how deep the cutting tool is being plunged into the bone. Such cutting tools are further discussed below. In some embodiments, the contour lines 112 can be provided as raised or recessed features on the guide surface 103, or they can be flush with the guide surface 103. In the illustrated example of the guide 100C, the contour lines 112 are provided on a portion of the guide surface 103 that is raised as shown in FIG. 5B. In another embodiment, not shown, the contour lines 112 can be color coded (i.e. different color for each depth).

Figure 6A:
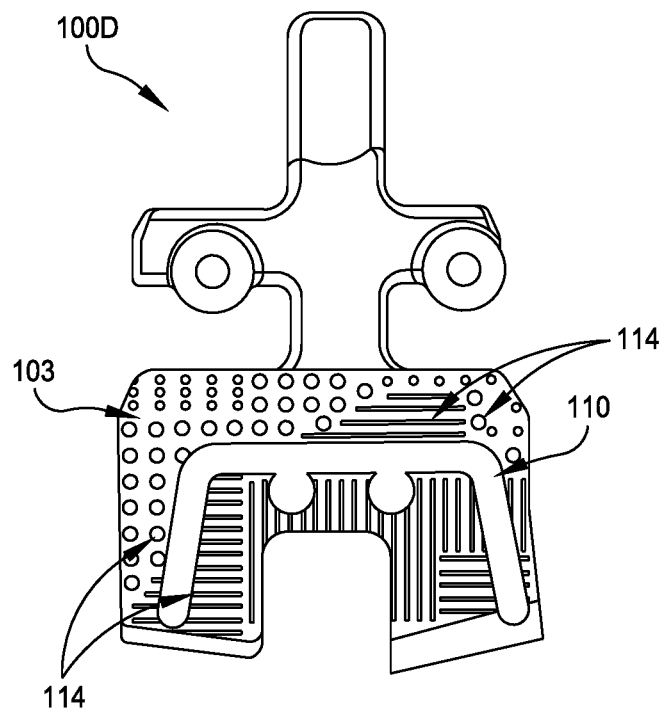
FIGS. 6A-6B are schematic illustrations of a cutting guide according to an embodiment.
Figure 6B:
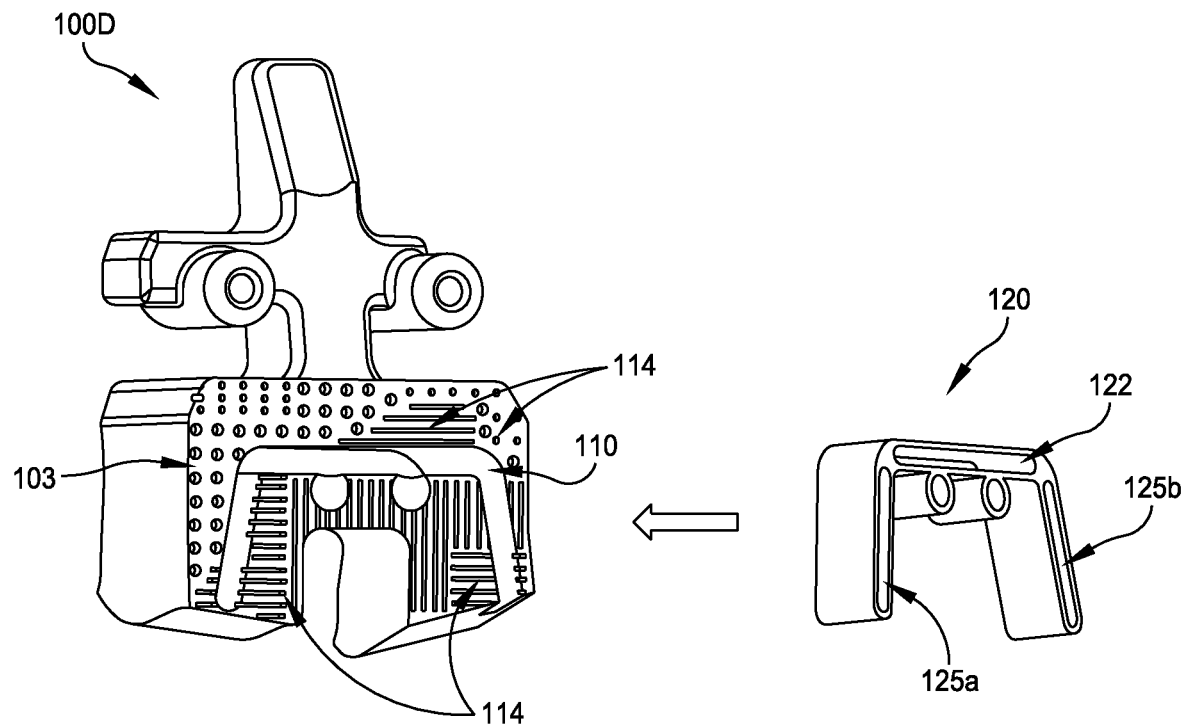

Referring to FIGS. 6A-6B, in a guide embodiment 100D, the at least one prescribed patient-specific depth of cut information on the guide surface is provided in the form of a plurality of patterns 114. The patterns 114 can be provided just as visual markings or provided as textured patterned markings. Whether they are purely visual markings or textured markings, the patterns 114 can comprise a different pattern for different depth of cut. Thus, similar to the contour lines 112 in the guide embodiment 100C, the patterns 114 provide a visual cue that inform the surgeon how deep to make the cut.

In some embodiments of the guide 100A, 100B, 100C, 100D, the first bone surface 30 is anterior surface of a distal end of a tibia 16, wherein the at least one aperture 122, 125a, 125b comprise a main aperture 122 and, when the bone contact surface 101 is placed in contact with the first bone surface, the main aperture 122 extends in a substantially medial to lateral direction (see e.g. FIG. 5A), and wherein the depth of the cut information varies along the main aperture's length.

In some embodiments of the guide, the at least one aperture further comprises one or more secondary aperture 125a, 125b extending at a different direction from the main aperture 122, and wherein the depth of the cut information varies along the secondary aperture's length.

In some embodiments of the guide, the guide is preferably made of a plastic or a polymer material that is suitable for 3-D printing in order to enable the patient-specific features such as the bone contacting surface 101 and the at least one prescribed patient-specific depth of cut information on the guide surface 103, the at least one aperture can comprise a protective sleeve 120 for protecting the guide from the cutting tool received in the aperture 122, 125a, 125b. The protective sleeve 120 can be made of a material that is durable to withstand the abrasion that may come from the mechanical interaction with the cutting tool that extends through the aperture. In some embodiments, the protective sleeve 120 can be made of a metal or metal alloy. The protective sleeve 120 may be manufactured with a press fit into the guide or alternatively manufactured within a guide using plastic injection over-mold techniques.

In some embodiments, the protective sleeve 120 is recessed within the at least one aperture 122, 125a, 125b for engaging with a depth stop on the cutting tool to resist tilting of the cutting tool.

As shown in FIG. 3E as an example, the guides 100A, 100B, 100C, 100D can be configured with two or more holes 106 for guiding fixation pins (e.g. Steinmann pins) for securing the guide to the bone before the cutting procedure can begin. The guides can also be configured with two or more holes 126 for guiding the fixation pins to different areas of the same bone, bone fragments or different bones. The guide pins may include depth stops, such as an olive wire or ledge (not shown), providing a specific pin length which provides a physical depth stop relative to the guide surface 103. An alternative embodiment includes circumferential depth markings, such as laser markings, to suggest a depth stop relative to the contoured guide surface 103. The depth of the pin placement is controlled with reference to the height of the guide holes 106, 126 and provides a means for precise placement of the far tip at the far cortical edge of the bone. In some instances, the fixation pins can be placed into the bone through the entire length of the bone depth 52. In other instances, the fixation pins can be placed partially into the bone depth 52 to a specific distance referenced from the first bone surface 30. In another embodiment, not shown, the guide pins may be non-circular spikes, wedges, or shims.

Referring to FIG. 7A-7F, also disclosed is a cutting guide 100E. The guide 100E comprises a bone contacting surface 101 comprising a contour that is complementary to a contour of the first bone surface on the bone 19 such that the bone contacting surface conformably mates with the first bone surface when placed against the first bone surface; a guide surface 103 spaced apart from the bone contacting surface 101 and provided thereon with at least one prescribed patient-specific depth of cut information in correspondence with the varying bone depth. The guide 100E also comprises at least one aperture 122 extending through the guide 100E from the guide surface 103, wherein the aperture 122 is configured to receive and guide a cutting tool for cutting the bone.

In some embodiments of the guide 100E, the at least one prescribed patient-specific depth of cut information is provided in the form of a contoured surface for the guide surface 103. In some embodiments, the at least one prescribed patient-specific depth of cut information is provided in the form of a plurality of discrete surfaces provided near the at least one aperture 122 similar to the discrete surfaces 130 provided in the guide embodiment 100B. In some embodiments, the plurality of discrete surfaces are provided along the at least one aperture 122. In some embodiments, the at least one prescribed patient-specific depth of cut information is provided in the form of one or more contour lines similar to the contour lines 112 provided in the guide embodiment 100C. In some embodiments, the contour lines can be provided as raised features on the guide surface 103, recessed features on the guide surface 103, or flush with the guide surface 103. In some embodiments, the contour lines can be color coded.

Figure 7A:
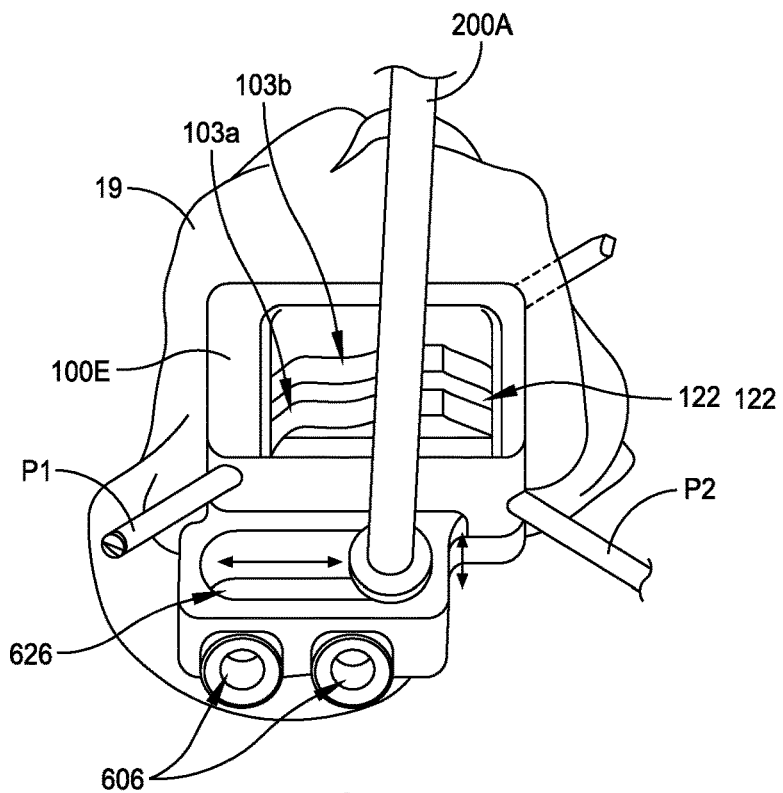
FIG. 7A-7F are schematic illustrations of a cutting guide according to an embodiment.
Figure 7B:
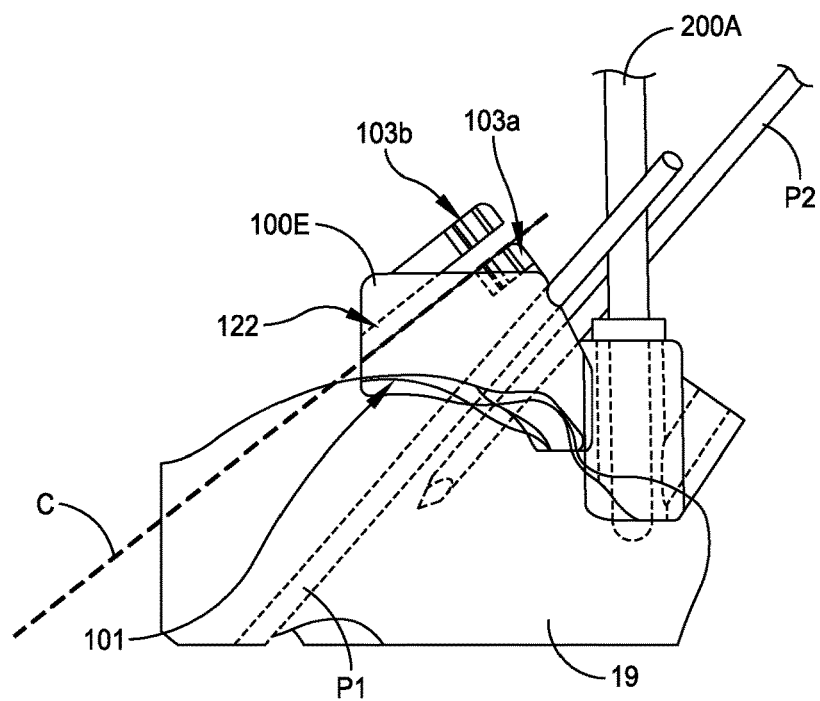
Figure 7C:
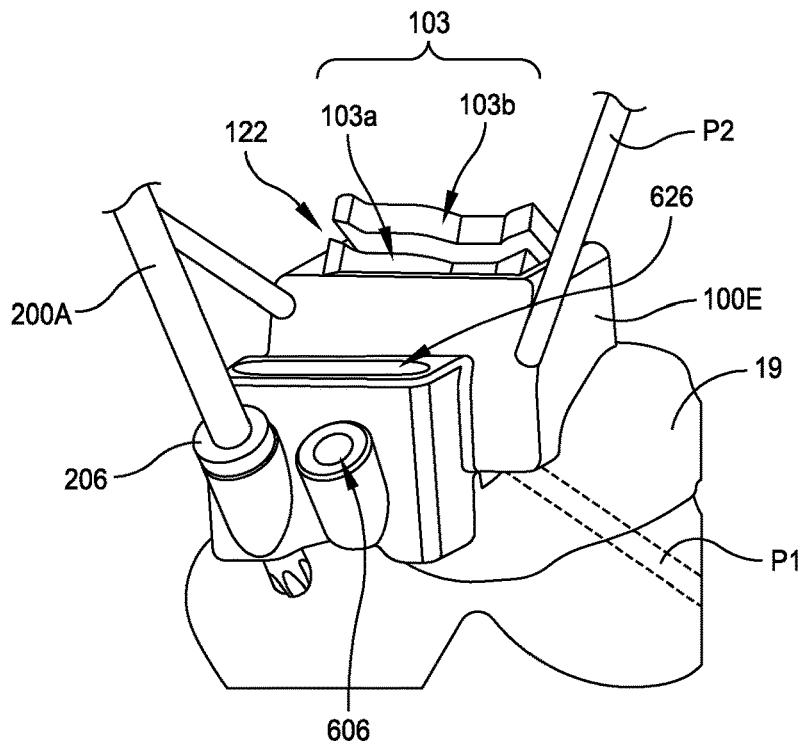
Figure 7D:
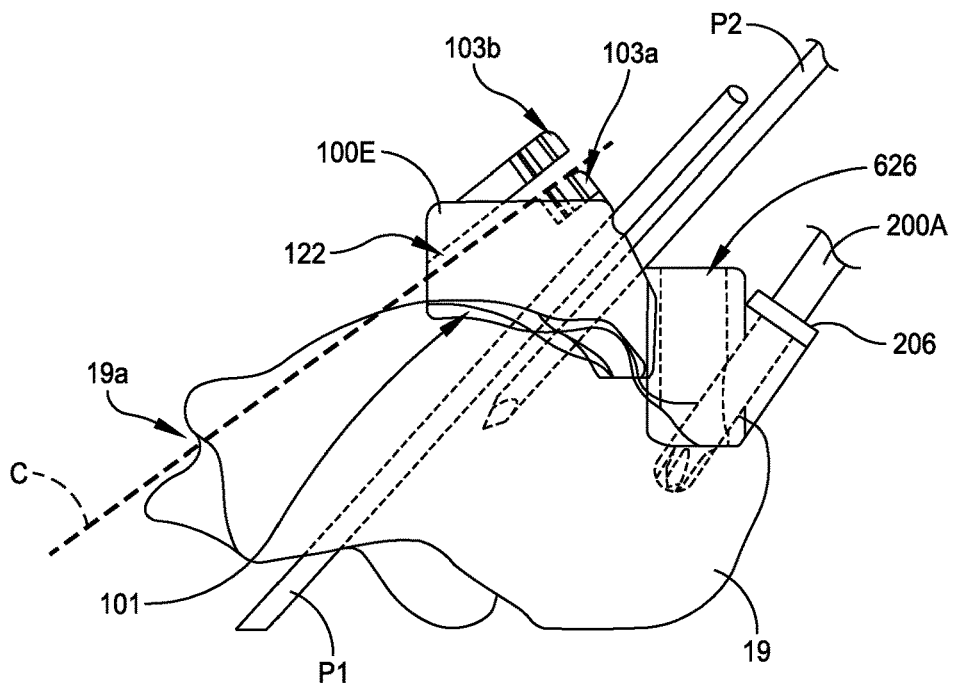
Figure 7E:
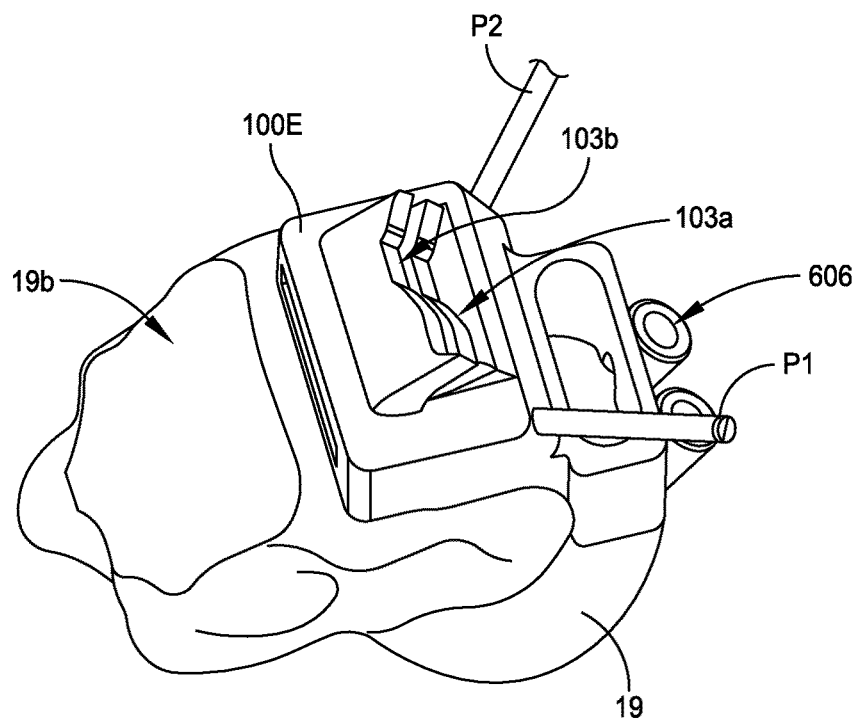
Figure 7F:
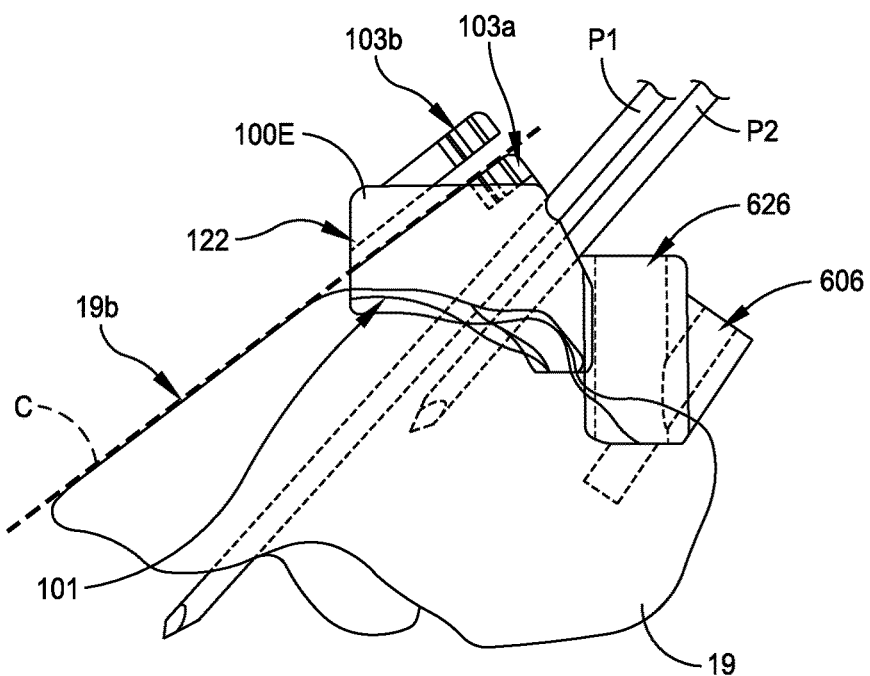

In the illustrated example, the at least one aperture 122 extends through the guide 100E along the direction C as shown in FIG. 7D towards the second bone surface 19a. In the illustrated example, the guide surface 103 is divided by the aperture 122 into two sections 103a, 103b.

The guide 100E can be configured to be used with a multiple tools, or designed such that a same tool can be used for different cuts or sculpts. For example, in the illustrated configuration of the guide 100E, the guide further comprises additional guide holes 626 and 606 for guiding a burr 200A for making additional cuts into the bone 19 at different locations via the guide holes 626 and 606 in addition to the aperture 122. The burr 200A can be used to create a flat face 19b (See FIG. 7E) in the bone 19 guided by the aperture 122, as well as prepare blind holes in the bone 19 using the guide holes 626 and 606. The hard stop shoulder 206 on the burr 200A can interact with the guide surface 103 to guide the depth of the plunge being made with the burr 200A in the embodiments where the prescribed patient-specific depth of cut information on the guide surface 103 is provided in the form of a continuous contoured surface or the discrete surfaces. Such additional guide holes can be provided in the other guide embodiments 100A, 100B, 100C, and 100D also. Such feature allows a combination of multiple types of bone preparation using a single guide with the ability to control depth of cutting or sculpting or bone removal in different planes. Multiple types of bone preparation mechanisms on the same guide instrument allows for a method of eliminating steps within a surgery by combining different types of cuts into the same guide instrument, to the benefit of surgeon and patient.

The guide 100E can be configured to receive one or more fixation pins such as P1, P2 shown in FIGS. 7A-7F to secure the guide 100E to the bone 19 before the cutting procedure can begin.

In all of the guide embodiments disclosed herein, the prescribed patient-specific depth of cut information can be configured to match the contour of the second bone surface of any portion of the bone being cut.

[Surgical Kit]

According to another aspect, disclosed is a surgical kit for use in removing a portion of a bone, the bone having a first bone surface and a second bone surface on opposite side of the first bone surface, wherein a varying bone depth is defined between the first bone surface and the second bone surface. The kit comprises any one of the embodiments of the guide 100A, 100B, 100C, and 100D, and a cutting tool 200A, 200B comprising an elongated body 204 having a first end 201A, 201B and a second end 202A, 202B; and a cutting tip 205 provided at the first end 201A, 201B. Examples of the cutting tool 200A, 200B as bone cutting burrs are shown in FIGS. 7A and 7B, respectively.

Figures 8A, 8B:
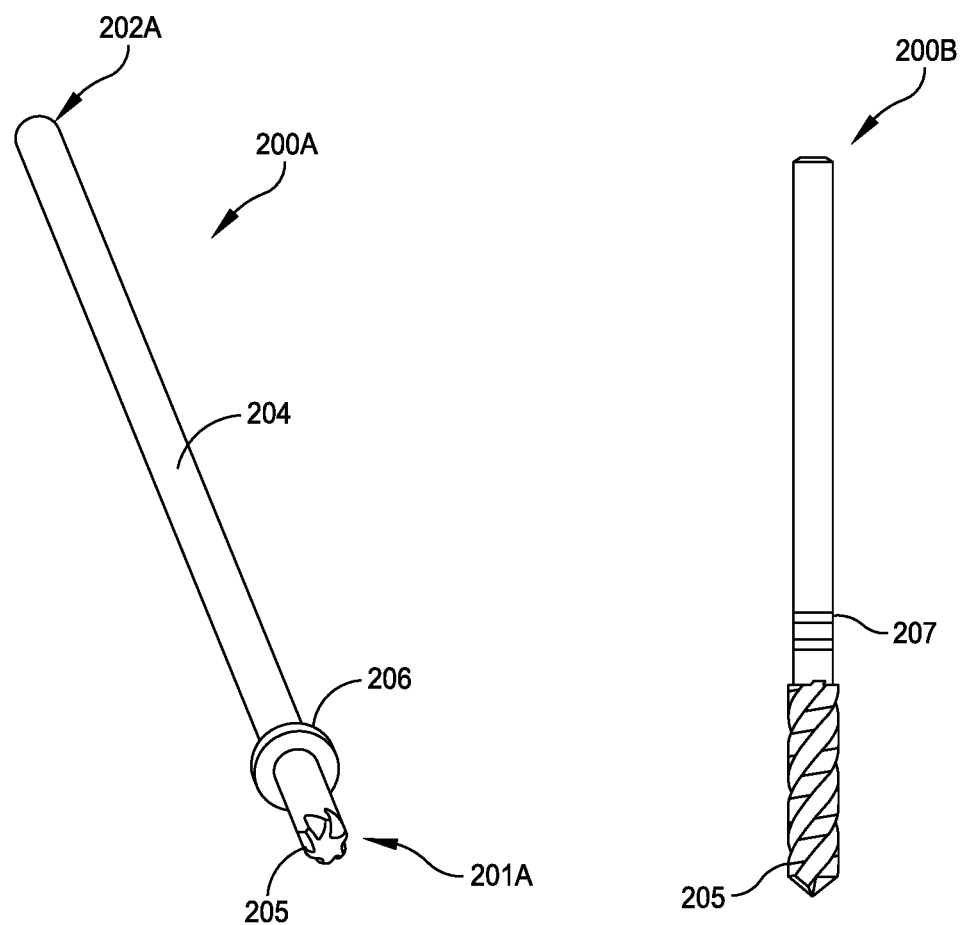
FIG. 8A is a schematic illustration of a bone cutting burr according to an embodiment.
FIG. 8B is a schematic illustration of a bone cutting burr according to another embodiment.
Figure 9A:
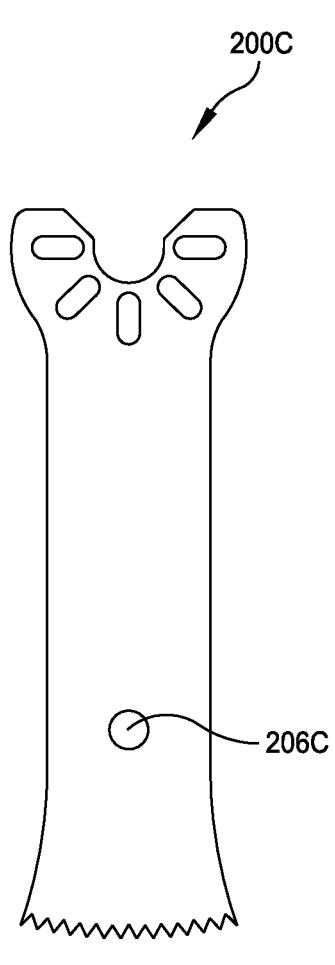
FIG. 9A is a schematic illustration of an oscillating type flat saw blade according to an embodiment.
Figure 9B:
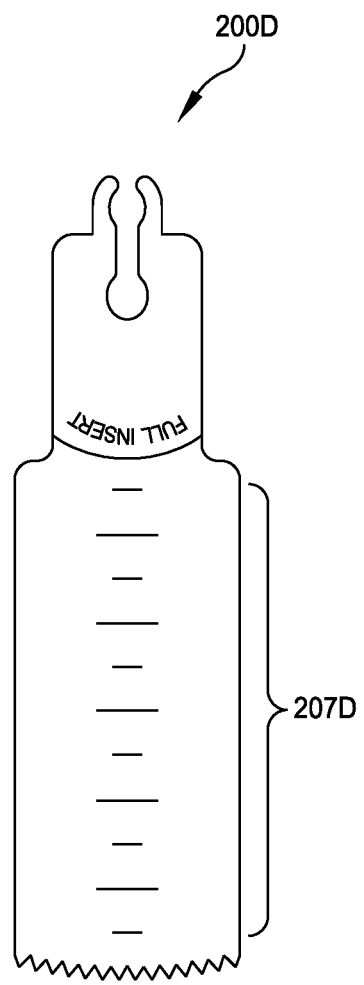
FIG. 9B is a schematic illustration of an oscillating type flat saw blade according to another embodiment.

Referring to FIG. 8A, in some embodiments of the kit, the cutting tool 200A comprises a depth stop shoulder 206 provided between the cutting tip 205 and the second end 202A at a predetermined distance from the cutting tip 205. The depth stop shoulder 206 is wider than the at least one aperture 122, 125a, 125b to limit the depth the cutting tip can extend through the at least one aperture 122, 125a, 125b to cut bone as the cutting tool 200A is guided within the at least one aperture.

In some embodiments, the depth stop shoulder 206 is sized to fit into the recess 103a of the guide embodiment 100B. The depth stop shoulder 206 has a generally cylindrical shape as shown in the example in FIG. 8A. Alternatively, the depth stop shoulder 206 can have a spherical shape. In further embodiments, the depth stop shoulder 206 can comprise one or more protruding structures such as pins or bumps extending from the elongated body 204 that can interfere with the at least one aperture 122, 125a, 125b to prevent the cutting tool 200A from extending too far into the at least one aperture 122, 125a, 125b.

Referring to FIG. 8B, in some embodiments of the kit, the cutting tool 200B comprises at least one depth marking 207 on the elongated body such that aligning the depth marking 207 with the guide surface 103, when the cutting tip 205 is plunged into the bone through the at least one aperture 122, 125a, 125b, maintains the cutting tip 205 at a desired depth relative to the guide surface. The at least one depth marking 207 can be graduated to denote the distance from the cutting tip 205 so that the surgeon can visually see how deep the cutting tool has cut into the bone. The depth marking 207 can be formed on the elongated body of the cutting tool 200B by any appropriate means. For example, the depth marking 207 can be engraved or etched into the elongated body.

In some embodiments of the kit, the guide is the guide embodiment 100A, wherein the at least one prescribed patient-specific depth of cut information on the guide surface 103 is provided in the form of a contoured surface for the guide surface 103.

In some embodiments of the kit, the guide is the guide embodiment 100B, wherein at least one prescribed patient-specific depth of cut information on the guide surface 103 is provided in the form of a plurality of discrete surfaces 130.

In some embodiments of the kit, the at least one prescribed patient-specific depth of cut information on the guide surface 103 is provided in the form of one or more contour lines 112.

In some embodiments of the kit, the at least one prescribed patient-specific depth of cut information on the guide surface 103 is provided in the form of a visual and/or textured patterns 114.

In some embodiments of the kit, the at least one aperture further comprises one or more secondary aperture 125a, 125b extending at a different direction from the main aperture 122, and wherein the depth of the cut information varies along the secondary aperture's length.

In some embodiments of the kit, the at least one aperture comprises a protective sleeve 120 for protecting the guide from the cutting tool received in the aperture 122, 125a, 125b.

In some embodiments of the kit, the protective sleeve 120 is recessed within the at least one aperture 122, 125a, 125b for engaging with a depth stop 206 on the cutting tool to resist tilting of the cutting tool.

Figure 10:
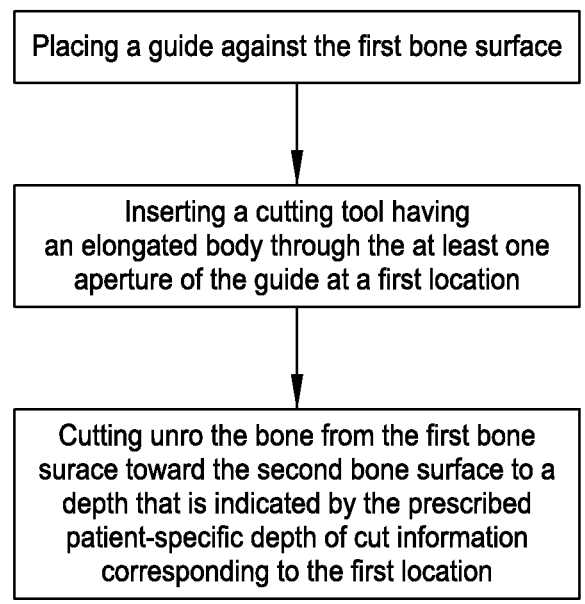
FIG. 10 is a flowchart illustrating a method according to an embodiment.

A method for cutting a bone is also disclosed. As an example, a tibia 16 shown in FIGS. 1-2B will be used as an example of the bone being cut. The bone 16 has a first bone surface 30 and a second bone surface 32 on opposite side of the first bone surface, wherein a varying bone depth 52 is defined between the first bone surface 30 and the second bone surface 32. Referring to the flowchart 300 in FIG. 10, the method comprises:
  (a) placing a guide against the first bone surface 30, wherein the guide is any one of the guide embodiments 100A, 100B, 100C, 100D disclosed herein (Step 301);
  (b) inserting a cutting tool 200A, 200B having an elongated body through the at least one aperture 122, 125a, 125b at a first location (Step 302); and
  (c) cutting into the bone from the first bone surface 30 toward the second bone surface 32 to a depth that is indicated by the prescribed patient-specific depth of cut information corresponding to the first location (Step 303).

In some embodiments, the method further comprises:
  (d) retracting the cutting tool 200A, 200B from the first location;
  (e) inserting the cutting tool 200A, 200B through the at least one aperture 122, 125a, 125b at a second location; and
  (f) cutting into the bone from the first bone surface 30 toward the second bone surface 32 to a depth that is indicated by the prescribed patient-specific depth of cut information corresponding to the second location.

In some embodiments of the method, the cutting tool is the cutting tool 200A shown in FIG. 8A and the step (c) comprises cutting into the bone until the depth stop 206 contacts the guide surface 103.

In some embodiments of the method, the cutting tool is the cutting tool 200B shown in FIG. 8B and the step (c) comprises cutting into the bone until a desired one of the depth markings 207 aligns with the guide surface 103.

[Tools with Depth Marking]

Figure 2A:
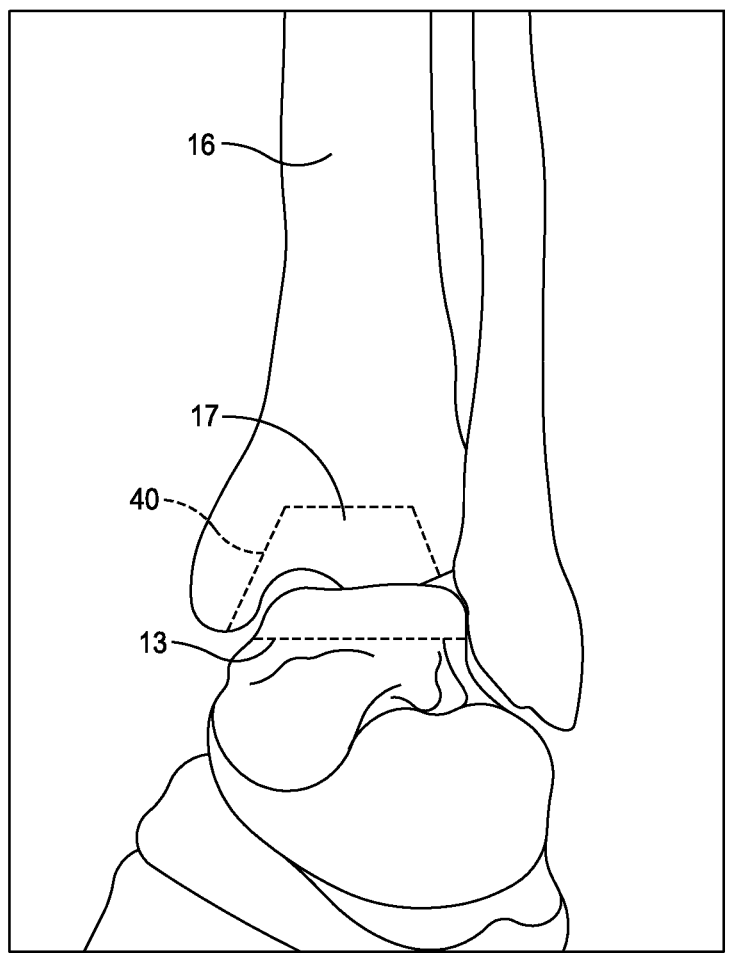
FIG. 2A is a schematic illustration of a human ankle skeletal structure seen from the anterior side.
Figure 2B:
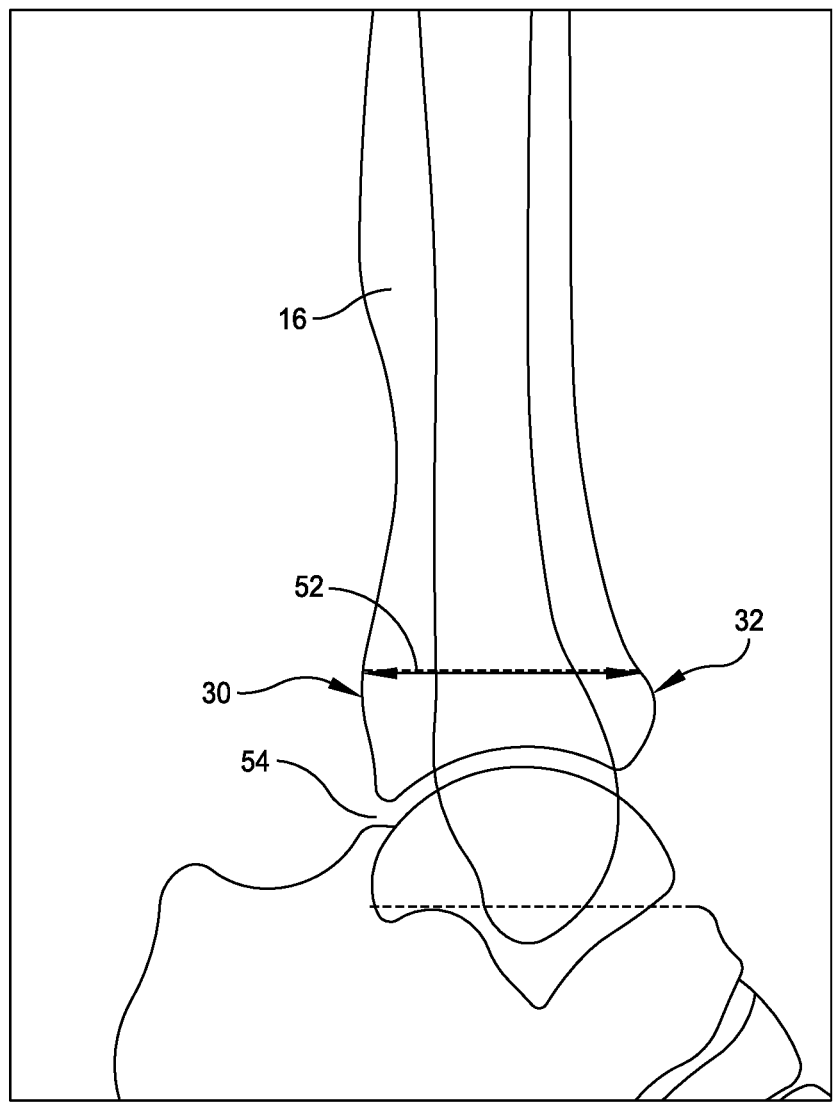
FIG. 2B is a schematic illustration of a human ankle skeletal structure seen from the medial side.
Figure 2C:
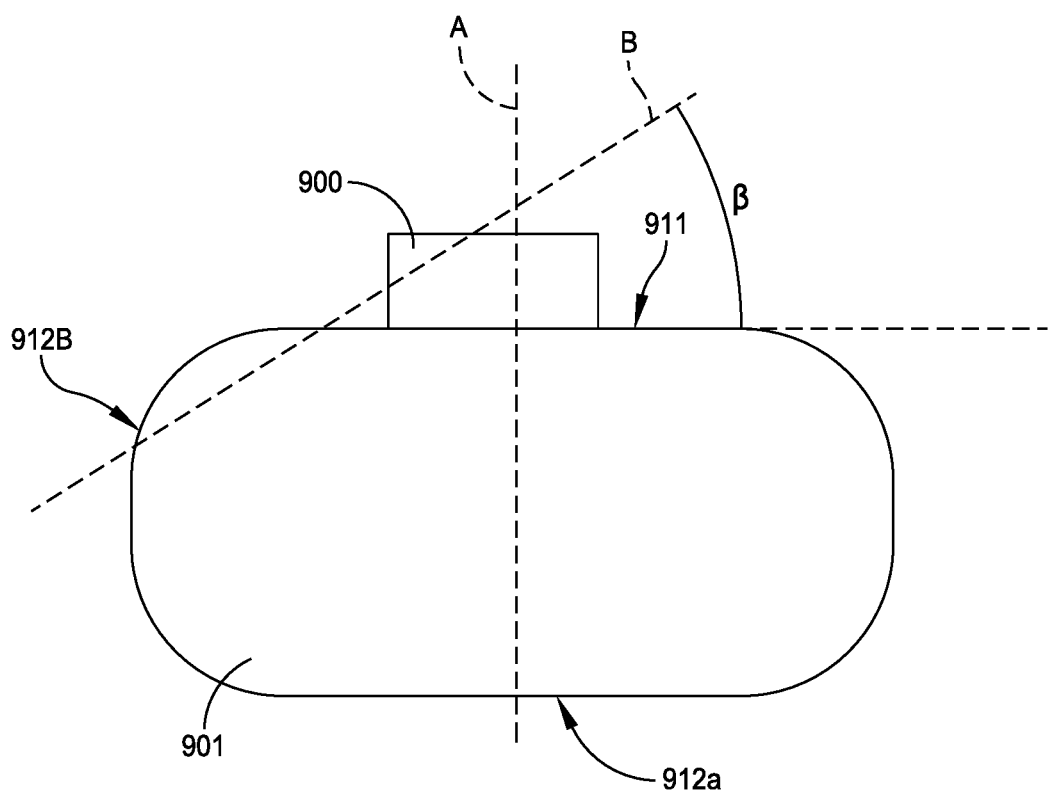
FIG. 2C is a schematic illustration of a hypothetical bone and a hypothetical cutting guide illustrating different bone cutting directions that can be accommodated by the various embodiments of the cutting guide of the present disclosure.
Figure 11:
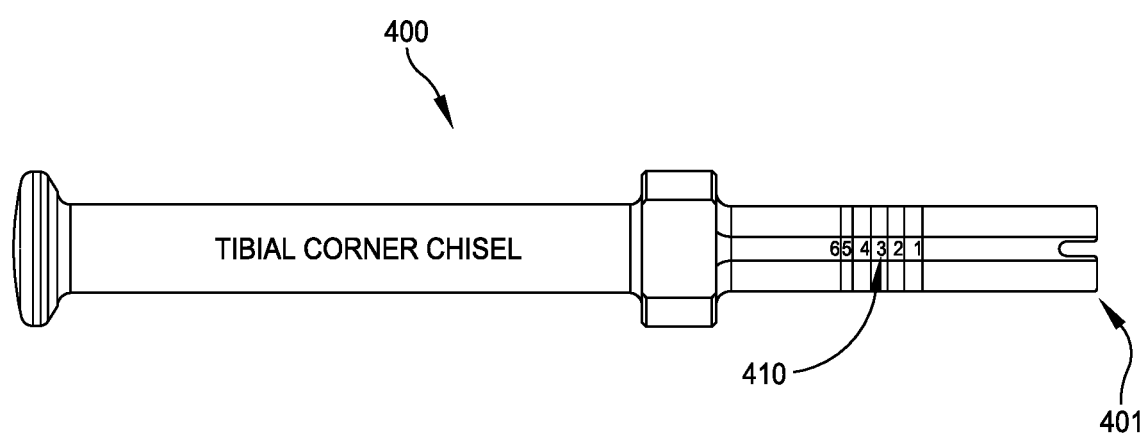
FIG. 11 is a schematic illustration of a corner chisel used in tibial preparation for total ankle replacement procedure.
Figure 12:
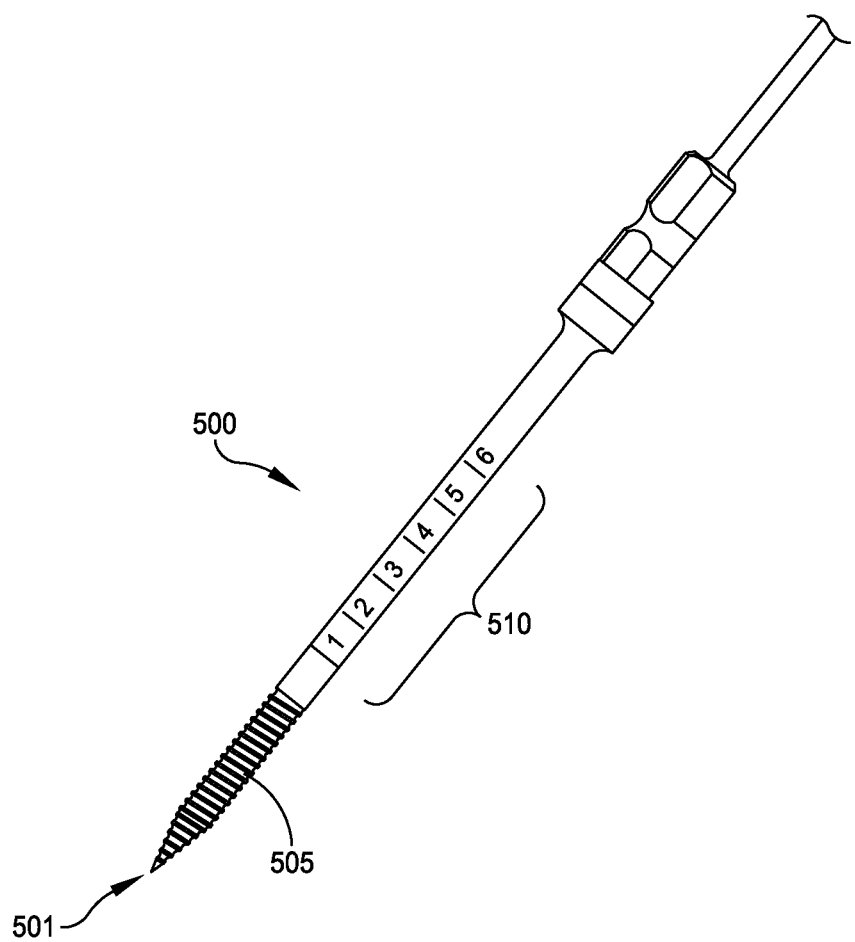
FIG. 12 is a schematic illustration of a bone removal screw tool according to an embodiment.

Referring to FIGS. 11-12, bone removal tools, particularly the bone removal tools used in total ankle tibia preparation, that are configured with coordinated depth markings are disclosed. Referring to FIG. 2A, in total ankle tibia preparation, removing the tibial bone fragment 17 after the cuts 40 are made is a precise maneuver requiring chiseling into the ankle joint along the cuts 40 using a chisel, like the chisel 400 shown in FIG. 11, at blind depth to cut the bone fragment 17 free. Then, a bone removal screw tool 500 shown in FIG. 12, is screwed into the bone fragment 17 from the anterior side to remove it from the ankle joint. Currently, there are depth markings 410 on the chisel tools 400 as shown in FIG. 11 to provide a visual cue for the surgeon. However, the bone removal screw tool does not. Thus, adding depth markings 510 to the bone removal screw tool 500 as shown in FIG. 12 would be helpful. The depth markings 510 on the bone removal screw tool 500 is preferably coordinated to the depth markings 410 on the chisel 400. In other words, the two sets of depth markings 410 and 510 are graduated with the same interval at same distance points measured from the respective tips 401 and 501 of the tools.

It will be understood that the foregoing description is of exemplary embodiments of this invention, and that the invention is not limited to the specific forms shown. Modifications may be made in the design and arrangement of the elements without departing from the scope of the invention.

What is claimed is:

1. A guide for use in cutting a bone, the bone having a first bone surface and a second bone surface, wherein a varying bone depth is defined between the first bone surface and the second bone surface, the guide comprising:
  a bone contacting surface comprising a contour that is complementary to a contour of the first bone surface such that the bone contacting surface conformably mates with the first bone surface when placed against the first bone surface;
  a guide surface spaced apart from the bone contacting surface and provided thereon with at least one prescribed patient-specific depth of cut information in correspondence with the varying bone depth wherein the at least one prescribed patient-specific depth of cut information is provided in the form of one or more colored contour lines; and
  at least one aperture extending through the guide from the guide surface,
  wherein when the guide is placed on the bone against the first bone surface, the at least one aperture extends through the guide from the guide surface towards the second bone surface,
  wherein the aperture is configured to receive and guide a cutting tool for cutting the bone.

2. The guide of claim 1, wherein the first bone surface and the second bone surface are on opposite sides of the bone.

3. The guide of claim 1, wherein the at least one aperture extends through the guide from the guide surface to the bone contacting surface.

4. The guide of claim 1, wherein the at least one prescribed patient-specific depth of cut information is provided in the form of a contoured surface for the guide surface.

5. The guide of claim 1, wherein the at least one prescribed patient-specific depth of cut information is provided in the form of a plurality of discrete surfaces.

6. The guide of claim 5, wherein the plurality of discrete surfaces are provided along the at least one aperture.

7. The guide of claim 5, wherein the colored contour lines are provided as raised features on the guide surface, recessed features on the guide surface, or flush with the guide surface.

8. The guide of claim 1, wherein the at least one prescribed patient-specific depth of cut information on the guide surface is provided in the form of a plurality of colored contour patterns.

9. The guide of claim 8, wherein the patterns comprise visual markings or textured markings.

10. The guide of claim 9, wherein the patterns comprise a different pattern for different depth of cut.

11. The guide of claim 1, wherein the first bone surface is anterior surface of a distal end of a tibia, wherein the at least one aperture comprises a main aperture and, when the bone contact surface is placed in contact with the first bone surface, the main aperture extends in a substantially medial to lateral direction, and wherein the depth of the cut information varies along the main aperture's length.

12. The guide of claim 11, wherein the at least one aperture further comprises one or more secondary aperture extending at a different direction from the main aperture, and wherein the depth of the cut information varies along the secondary aperture's length.

13. The guide of claim 1, wherein the at least one aperture comprises a protective sleeve for protecting the guide from the cutting tool received in the aperture.

14. The guide of claim 13, wherein the protective sleeve is recessed within the at least one aperture for engaging with a depth stop on the cutting tool to resist tilting of the cutting tool.

15. A kit for use in removing a portion of a bone, the bone having a first bone surface and a second bone surface, wherein a varying bone depth is defined between the first bone surface and the second bone surface, the kit comprising:
   a guide comprising:
      a bone contacting surface comprising a contour that is complementary to a contour of the first bone surface such that the bone contacting surface conformably mates with the first bone surface when placed against the first bone surface;
      a guide surface spaced apart from the bone contacting surface and provided thereon with at least one prescribed patient-specific depth of cut information in correspondence with the varying bone depth wherein the at least one prescribed patient-specific depth of cut information is provided in the form of one or more colored contour lines; and
      at least one aperture extending through the guide from the guide surface, wherein the at least one aperture extends through the guide from the guide surface to the bone contacting surface, wherein the aperture is configured to receive and guide a cutting tool for cutting the bone; and
   a cutting tool comprising:
      an elongated body having a first end and a second end;
      a cutting tip provided at the first end.

16. The kit of claim 15, wherein the first bone surface and the second bone surface are on opposite sides of the bone.

17. The kit of claim 15, wherein the at least one prescribed patient-specific depth of cut information is provided in the form of a contoured surface for the guide surface.

18. The kit of claim 15, wherein the cutting tool comprises a depth stop provided between the cutting tip and the second end at a predetermined distance from the cutting tip, wherein the depth stop is wider than the at least one aperture to limit the depth the cutting tip can extend through the at least one aperture to cut bone as the cutting tool is guided within the at least one aperture.

19. The kit of claim 15, wherein the cutting tool includes at least one depth marking on the elongated body such that aligning the depth marking with the guide surface, when the cutting tip is plunged into the bone through the at least one aperture, maintains the cutting tip at a desired depth relative to the guide surface.

20. The kit of claim 15, wherein the at least one prescribed patient-specific depth of cut information on the guide surface is provided in the form of a plurality of discrete surfaces.

21. The kit of claim 20, wherein the plurality of discrete surfaces are provided along the at least one aperture.

22. The kit of claim 15, wherein the at least one prescribed patient-specific depth of cut information on the guide surface is provided in the form of a textured key code.

23. The kit of claim 15, wherein the at least one aperture in the guide further comprises one or more secondary aperture extending at a different direction from the main aperture, and wherein the depth of the cut information varies along the secondary aperture's length.

24. The kit of claim 23, wherein the at least one aperture comprises a protective sleeve for protecting the guide from the cutting tool received in the aperture.

25. The kit of claim 15, wherein the cutting tool is a burr and further comprises a depth stop provided between the cutting tip and the second end at a predetermined distance from the cutting tip, wherein the depth stop is configured and dimensioned to interfere with the at least one aperture in the guide and limit the depth the cutting tip can extend through the at least one aperture to cut bone.

26. The kit of claim 15, wherein the cutting tool is a flat saw blade and further comprises a depth stop provided between the cutting tip and the second end at a predetermined distance from the cutting tip, wherein the depth stop is configured and dimensioned to interfere with the at least one aperture in the guide and limit the depth the cutting tip can extend through the at least one aperture to cut bone.

27. A method for cutting a bone, the bone having a first bone surface and a second bone surface on opposite side of the first bone surface, wherein a varying bone depth is defined between the first bone surface and the second bone surface, the method comprising:
   (a) placing a guide against the first bone surface, wherein the guide comprises:
      a bone contacting surface comprising a contour that is complementary to a contour of the first bone surface such that the bone contacting surface conformably mates with the first bone surface when placed against the first bone surface;
      a guide surface spaced apart from the bone contacting surface and provided thereon with at least one prescribed patient-specific depth of cut information in correspondence with the varying bone depth wherein the at least one prescribed patient-specific depth of cut information is provided in the form of one or more colored contour lines; and
      at least one aperture extending through the guide from the guide surface, wherein when the guide is placed on the bone against the first bone surface, the at least one aperture extends through the guide from the guide surface towards the second bone surface, wherein the aperture is configured to receive and guide a cutting tool for cutting the bone; and
   (b) inserting a cutting tool having an elongated body through the at least one aperture at a first location; and
   (c) cutting into the bone from the first bone surface toward the second bone surface to a depth that is indicated by the prescribed patient-specific depth of cut information corresponding to the first location.

28. The method of claim 27, further comprising:
   (d) retracting the cutting tool from the first location;
   (e) inserting the cutting tool through the at least one aperture at a second location; and
   (f) cutting into the bone from the first bone surface toward the second bone surface to a depth that is indicated by the prescribed patient-specific depth of cut information corresponding to the second location.

29. The method of claim 27, wherein the cutting tool comprises a depth stop provided between the cutting tip and the second end at a predetermined distance from the cutting tip, wherein the depth stop is wider than the at least one aperture to limit the depth the cutting tip can extend through the at least one aperture to cut bone as the cutting tool is guided within the at least one aperture; and the step (c) comprises cutting into the bone until the depth stop contacts the guide surface.

30. The method of claim 27, wherein the cutting tool comprises:

an elongated body having a first end and a second end;

a cutting tip provided at the first end; and a plurality of depth markings provided on the elongated body such that aligning one of the depth markings with the guide surface maintains the cutting tip of the cutting tool at a depth relative to the guide surface that corresponds to said one of the depth markings; and wherein the step (c) comprises cutting into the bone until a desired one of the depth markings aligns with the guide surface.

* * * * *